US009430737B2

(12) United States Patent
Srinivasa et al.

(10) Patent No.: US 9,430,737 B2
(45) Date of Patent: Aug. 30, 2016

(54) SPIKING MODEL TO LEARN ARBITRARY MULTIPLE TRANSFORMATIONS FOR A SELF-REALIZING NETWORK

(71) Applicant: HRL LABORATORIES, LLC, Malibu, CA (US)

(72) Inventors: Narayan Srinivasa, Oak Park, CA (US); Youngkwan Cho, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 186 days.

(21) Appl. No.: 14/015,001

(22) Filed: Aug. 30, 2013

(65) Prior Publication Data

US 2015/0026110 A1 Jan. 22, 2015

Related U.S. Application Data

(60) Provisional application No. 61/799,883, filed on Mar. 15, 2013.

(51) Int. Cl.
*G06N 3/08* (2006.01)
*G06N 3/04* (2006.01)

(52) U.S. Cl.
CPC ............... *G06N 3/08* (2013.01); *G06N 3/049* (2013.01)

(58) Field of Classification Search
None
See application file for complete search history.

(56) References Cited

U.S. PATENT DOCUMENTS

| 2003/0179933 | A1* | 9/2003 | Kato et al. | 382/190 |
| 2006/0184462 | A1* | 8/2006 | Hawkins | 706/14 |
| 2009/0043722 | A1 | 2/2009 | Nugent | |
| 2011/0004579 | A1* | 1/2011 | Snider | 706/25 |
| 2012/0109863 | A1* | 5/2012 | Esser et al. | 706/25 |
| 2012/0109866 | A1 | 5/2012 | Modha | |
| 2012/0259804 | A1 | 10/2012 | Brezzo | |
| 2013/0046716 | A1* | 2/2013 | Chan et al. | 706/18 |

FOREIGN PATENT DOCUMENTS

WO 2012-006469 1/2012

OTHER PUBLICATIONS

International Search Report and Written Opinion for PCT/US2013/057724.
T. P. Vogels, K. Rajan and L. F. Abbott, "Neural Network Dynamics," *Annual Review Neuroscience*, vol. 28, pp. 357-376, (Mar. 22, 2005).
W. Gerstner and W. Kistler, *Spiking Neuron Models—Single Neurons, Populations, Plasticity*, Cambridge University Press, pp. 93-146 (2002).

(Continued)

*Primary Examiner* — Alan Chen
(74) *Attorney, Agent, or Firm* — Ladas & Parry

(57) ABSTRACT

A neural network, wherein a portion of the neural network comprises: a first array having a first number of neurons, wherein the dendrite of each neuron of the first array is provided for receiving an input signal indicating that a measured parameter gets closer to a predetermined value assigned to said neuron; and a second array having a second number of neurons, wherein the second number is smaller than the first number, the dendrite of each neuron of the second array forming an excitatory STDP synapse with the axon of a plurality of neurons of the first array; the dendrite of each neuron of the second array forming an excitatory STDP synapse with the axon of neighboring neurons of the second array.

27 Claims, 10 Drawing Sheets

(56) References Cited

OTHER PUBLICATIONS

H. Markram, J. Lubke, M.Frotscher, & B. Sakmann, "Regulation of synaptic efficacy by coincidence of postsynaptic APs and EPSPs," *Science*, vol. 275, pp. 213-215, (Jan. 10, 1997).
Bi, G. Q., & M. Poo, "Activity-induced synaptic modifications inhippocampal culture: dependence on spike timing, synaptic strength and cell type," *J. Neuroscience*. vol. 18,pp. 10464-10472, (Dec. 15, 1998).
J. C. Magee and D. Johnston, "A synaptically controlled, associative signal for Hebbian plasticity in hippocampal neurons," *Science* vol. 275, pp. 209-213, (Jan. 10, 1997).
S. Song, K. D. Miller and L. F. Abbott, "Competitive Hebbian Learning Through Spike-Timing Dependent Synaptic Plasticity," *Nature Neuroscience*, vol. 3, No. 9 pp. 919-926, (Sep. 2000).
A. P. Davison and Y. Fregnac, "Learning Cross-Modal Spatial Transformations through Spike-Timing Dependent Plasticity," *Journal of Neuroscience*, vol. 26, No. 21, pp. 5604-5615, (May 24, 2006).
U.S. Appl. No. 13/679,727, filed Nov. 16, 2012, Albrecht.
U.S. Appl. No. 13/415,812, filed Mar. 8, 2012.
U.S. Appl. No. 13/708,823, filed Dec. 7, 2012.
Q. X. Wu, T. M. McGinnity, L. P. Maguire, A. Belatreche, B. Glackin, "2D co-ordinate transformation based on a spike-timing dependent plasticity learning mechanism," *Neural Networks*, vol. 21, pp. 1318-1327, (2008).
Q. X. Wu, T. M. McGinnity, L. P. Maguire, A. Belatreche, B. Glackin; "Processing visual stimuli using hierarchical spiking neural networks," *International Journal of Neurocomputing*, vol. 71, No. 10, pp. 2055-2068, (2008).
Narayan Srinivasa and Youngkwan Cho; "Self-Organizing Spiking Neural Model for Learning Fault-Tolerant Spatio-Motor Transformations," *IEEETransactions on Neural Networks and Learning Systems*, vol. 23, No. 10, (Oct. 2012) pp. 1526-1538.
R. Brette and W. Gerstner, "Adaptive Exponential Integrate- and—Fire Model as an Effective Description of Neuronal Activity", Journal of Neurophysiology, 94, pp. 3637-3642, (Jul. 13, 2005).
J. Sjostrom, G. Turrigiano, and S. Nelson, "Rate, Timing, and Cooperatively Jointly Determine Cortical Synaptic Plasticity'" *Neuron*, vol. 32, pp. 1149-1164 (Dec. 20, 2011).

\* cited by examiner

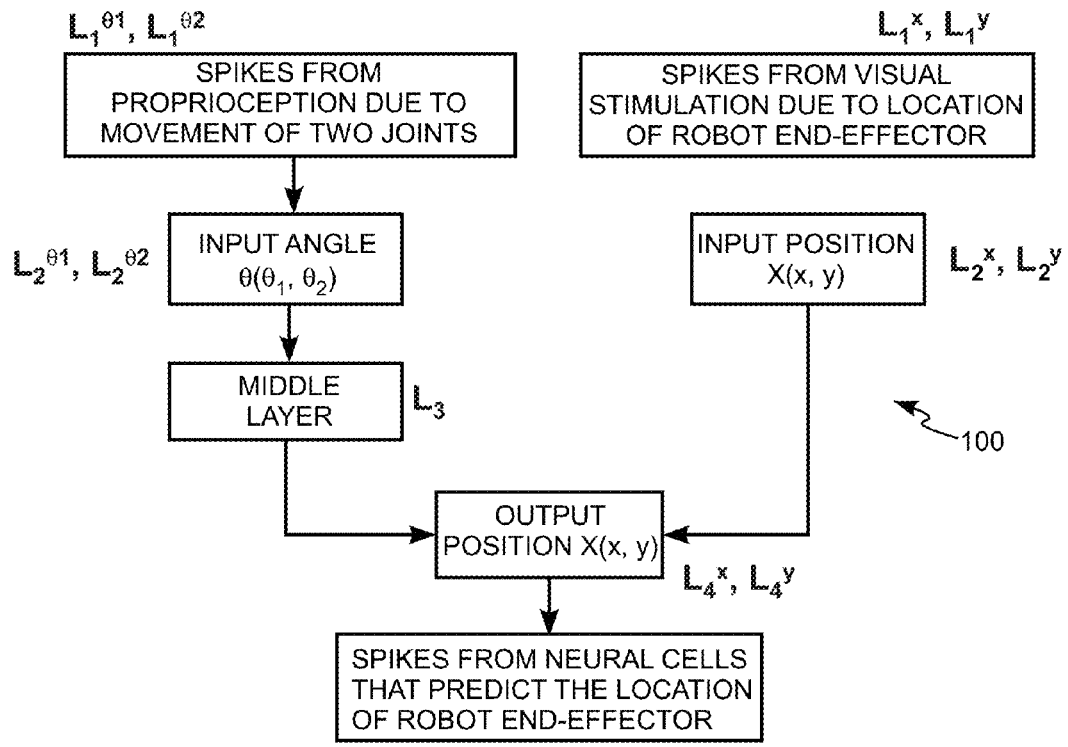
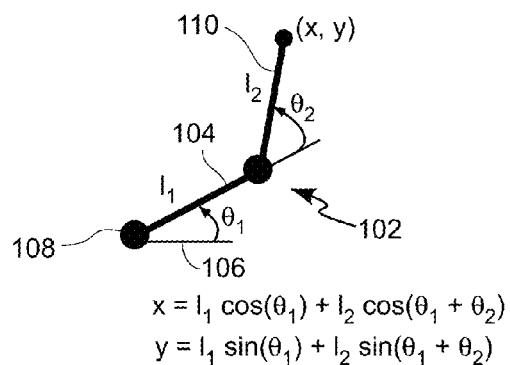
$x = l_1 \cos(\theta_1) + l_2 \cos(\theta_1 + \theta_2)$
$y = l_1 \sin(\theta_1) + l_2 \sin(\theta_1 + \theta_2)$
FIG. 8

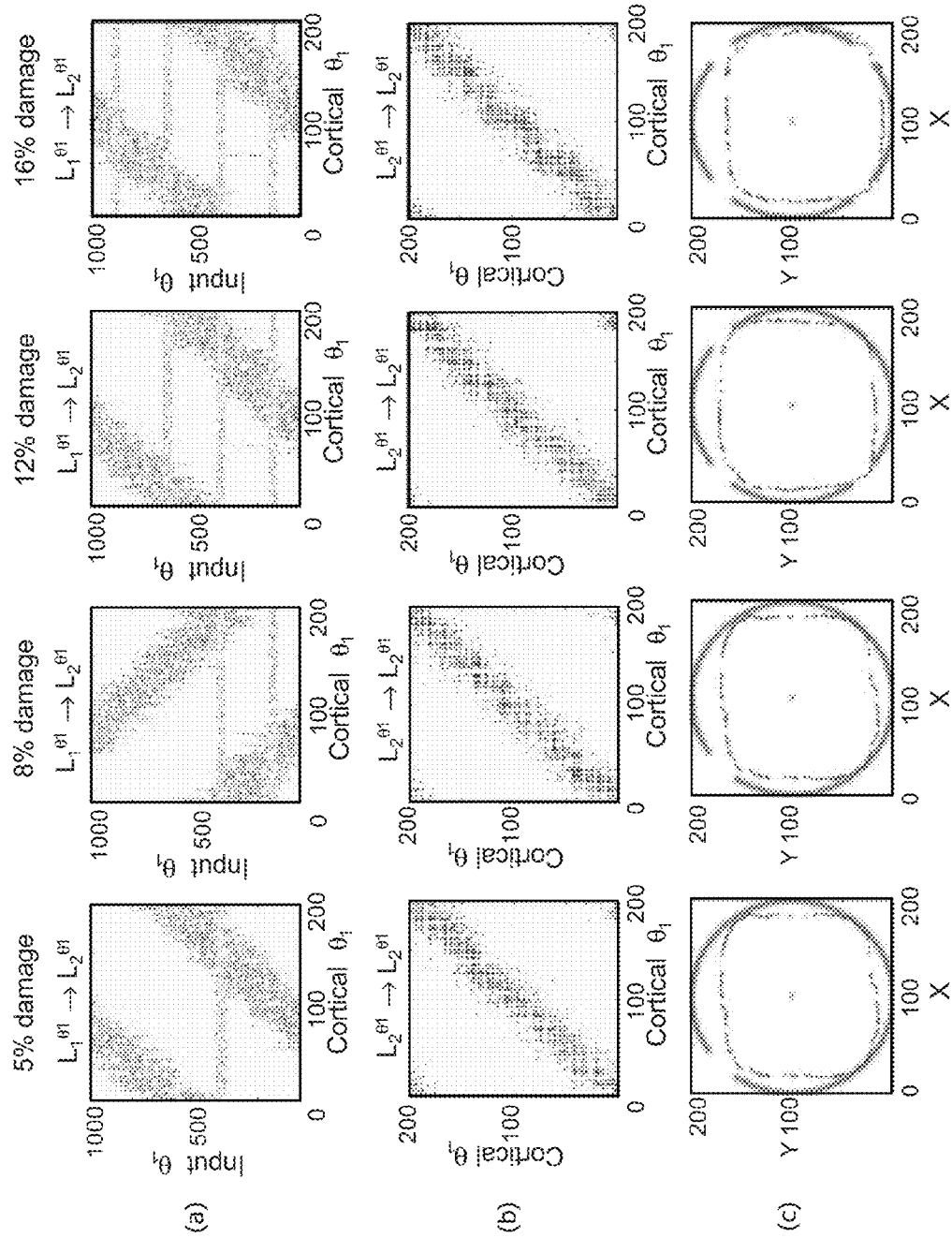

SPIKING MODEL TO LEARN ARBITRARY MULTIPLE TRANSFORMATIONS FOR A SELF-REALIZING NETWORK

CROSS REFERENCE TO RELATED APPLICATIONS

This application is a non-provisional and claims priority of U.S. provisional application No. 61/799,883, filed Mar. 15, 2013, which is incorporated herein as though set forth in full.

STATEMENT REGARDING FEDERALLY SPONSORED RESEARCH

This invention was made with support from the United States Government under contract number HR0011-09-C-0001 (SyNAPSE) awarded by the Defense Advanced Research Project Agency (DARPA). The United States Government has certain rights in the invention.

BACKGROUND OF THE DISCLOSURE

1. Field of the Disclosure

The present disclosure relates to neural networks; for example computer-implemented, as well as to methods for programming such networks. In particular, the present disclosure relates to a fault tolerant neural network capable of learning arbitrary multiple transformations, and a method of programming said neural network.

2. Background

Sensory perception and action are interdependent. In humans and other species, a behavior may be triggered by an ongoing situation and reflects a being's immediate environmental conditions. This type of behavior is often referred to as stimulus-response reflexes. The interdependency between stimulus and response creates an action perception cycle in which a novel stimulus triggers actions that lead to a better perception of itself or its immediate environmental condition and the cycle continues.

Human behavior is much more flexible than exclusive control by stimulus-response cycles. One attribute of intelligent-based systems is the ability to learn new relations between environmental conditions and appropriate behavior during action perception cycles. The primary mode of communication between neurons in the brain is encoded in the form of impulses, action potentials or spikes. The brain is composed of billions of neural cells, which are noisy, imprecise and unreliable analog devices. The neurons are complex adaptive structures that make connections between each other via synapses. A synapse has a presynaptic portion, comprising the axon of a neuron, inputing a spike into the synapse, and a postsynaptic portion comprising the dendrite of a neuron, sensitive to the spike being received in the synapse. The synapses may change their function dramatically depending upon the spiking activity of the neurons on either side of the synapse. The synapse includes an adaptation mechanism that adjusts the weight, or gain, of the synapse according to a spike timing dependent plasticity (STDP) learning rule.

Under the STDP rule, if an input spike to a neuron tends, on average, to occur immediately before that neuron's output spike, then that particular input is made somewhat stronger. On another hand, if an input spike tends, on average, to occur immediately after an output spike, then that particular input is made somewhat weaker hence: "spike-timing-dependent plasticity". Thus, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to 0. Since a neuron produces an output spike when many of its inputs occur within a brief period the subset of inputs that remain are those that tended to be correlated in time. In addition, since the inputs that occur before the output are strengthened, the inputs that provide the earliest indication of correlation eventually become the final input to the neuron.

Brain architectures composed of assemblies of interacting neurons and synapses with STDP can solve complex tasks and exhibit complex behaviors in real-time and with high precision but with very low power. However, modeling such activity in a physical network is complex.

Neural networks using analog and digital circuitry and computer-implemented methods have been discussed to implement a STDP learning rule. However, current models do not have the capacity to be tolerant to faults (i.e., to partial absence of sensory or motor input signals) introduced either from the beginning of the learning process or after some initial learning has taken place. Accordingly, the known systems that implement a STDP learning rule are incapable of learning for example arbitrary multiple transformations in a fault tolerant fashion.

Several examples of communication systems that have experienced the above described communication issues include T. P. Vogels, K. Rajan and L. F. Abbott, "Neural Network Dynamics," *Annual Review Neuroscience*, vol. 28, pp. 357-376, 2005; W. Gerstner and W. Kistler, *Spiking Neuron Models—Single Neurons, Populations, Plasticity*, Cambridge University Press, 2002; H. Markram, J. Lubke, M. Frotscher, & B. Sakmann, "Regulation of synaptic efficacy by coincidence of postsynaptic APs and EPSPs," *Science*, vol. 275, pp. 213-215, 1997; Bi, G. Q., & M. Poo, "Activity-induced synaptic modifications in hippocampal culture: dependence on spike timing, synaptic strength and cell type," *J. Neuroscience*. vol. 18, pp. 10464-10472, 1998; J. C. Magee and D. Johnston, "A synaptically controlled, associative signal for Hebbian plasticity in hippocampal neurons," *Science* vol. 275, pp. 209-213, 1997; S. Song, K. D. Miller and L. F. Abbott, "Competitive Hebbian Learning Through Spike-Timing Dependent Synaptic Plasticity," *Nature Neuroscience*, vol. 3 pp. 919-926, 2000; A. P. Davison and Y. Fregnac, "Learning Cross-Modal Spatial Transformations through Spike-Timing Dependent Plasticity," *Journal of Neuroscience*, vol. 26, no. 2, pp. 5604-5615, 2006; Q. X. Wu, T. M. McGinnity, L. P. Maguire, A. Belatreche, B. Glackin, "2D co-ordinate transformation based on a spike-timing dependent plasticity learning mechanism," *Neural Networks*, vol. 21, pp. 1318-1327, 2008; Q. X. Wu, T. M. McGinnity, L. P. Maguire, A. Belatreche, B. Glackin; "Processing visual stimuli using hierarchical spiking neural networks," *International Journal of Neurocomputing*, vol. 71, no. 10, pp. 2055-2068, 2008. Each of the above references is hereby incorporated by reference in its entirety.

FIG. 1 illustrates a network model described in the above reference entitled "Learning Cross-Modal Spatial Transformations through Spike-Timing Dependent Plasticity". FIG. 1 shows a neural network that receives in input the angle θ at the joint of an arm with 1 Degree of Freedom (df) and the position x of the end of the arm, in a vision-centered frame of reference. After a learning phase the neural network becomes capable of outputting x based on the angle θ at the joint. The neural network 10 comprises a first one-dimension array 12 of input neurons 14 that each generate spikes having a firing rate that increases as a function of the angle θ getting closer to an angle assigned to the neuron. FIG. 1 illustrates the firing rate FR of all the neurons 14 of array 12 for a given value of the angle θ. The neural network 10 further comprises a second one-dimension array 16 of input neurons 18 that each generate spikes having a firing rate that increases as a function of the position x getting closer to a predetermined value assigned to the neuron. FIG. 1 illustrates the firing rate FR of all the neurons 18 of array 16 for a given value of the position x. The neural network 10 comprises a third one-dimension array 20 of neurons 22.

Connections are initially all-to-all (full connection) from the neurons 14 to the neurons 22, and the strength of the connections is subject to modification by STDP. Connections from the neurons 18 to the neurons 22 are one to one. The strength of these non-STPD (or non-plastic) connections is fixed.

After a learning phase where stimuli corresponding to random angle θ and their equivalent position x are sent to array 20, array 16 ceases to provide input to the array 20, and array 20 outputs a position x in response to a based on the angle θ at the joint. FIG. 1 illustrates the firing rate FR output by the neurons 22 of array 20 in response to a given value of the angle θ after the learning phase.

FIG. 2 illustrates in schematic form the neural network 10 of FIG. 1 and shows input array/layer 12 fully connected to output array/layer 20 and training array/layer 16 connected on-to-one to output array/layer 20.

FIG. 3 schematizes a neural network 30 such as disclosed in the Wu et al. reference above. The neural network 30 comprises a training layer 16 connected one-to-one to an output layer 20 as detailed in FIG. 1. Further, neural network 30 comprises two input layers 12 topographically connected in input of a network layer 32, the network layer 32 being fully connected in input of output layer 20. As outlined above, the neural networks of FIGS. 1-3 are not tolerant to faults such as a partial absence of sensory or motor input signals, introduced either from the beginning of the learning process or after some initial learning has taken place.

There exists a need for neural networks that would be tolerant to fault.

SUMMARY

An embodiment of the present disclosure comprises a neural network, wherein a portion of the neural network comprises: a first array having a first number of neurons, wherein the dendrite of each neuron of the first array is provided for receiving an input signal indicating that a measured parameter gets closer to a predetermined value assigned to said neuron; a second array having a second number of neurons, the dendrite of each neuron of the second array forming an excitatory STDP synapse with the axon of a plurality of neurons of the first array; the dendrite of each neuron of the second array forming an excitatory STDP synapse with the axon of neighboring neurons of the second array.

According to an embodiment of the present disclosure, the second number is smaller than the first number.

According to an embodiment of the present disclosure, the second array further comprises a third number of interneurons distributed among the neurons of the second array, wherein the third number is smaller than the second number, wherein: the axon of each neuron of the second array forms an excitatory STDP synapse with the dendrite of the neighboring interneurons of the second array; and the axon of each interneuron of the second array forms an inhibitory STDP synapse with the dendrite of the neighboring neurons and interneurons of the second array.

According to an embodiment of the present disclosure, the dendrite of each neuron of the first array is provided for receiving an input signal having a rate that increases when a measured parameter gets closer to a predetermined value assigned to said neuron.

An embodiment of the present disclosure comprises a neural network having a first and a second neural network portions as described above, as well as a third array having a fourth number of neurons and a fifth number of interneurons distributed among the neurons of the third array, wherein the fifth number is smaller than the fourth number, wherein: the axon of each neuron of the third array forms an excitatory STDP synapse with the dendrite of the neighboring interneurons of the third array; and the axon of each interneuron of the third array forms an inhibitory STDP synapse with the dendrite of the neighboring neurons and interneurons of the third array; wherein the axon of each neuron of the second array of the first neural network portion forms an excitatory STDP synapse with the dendrite of a plurality of neurons of the third array; and wherein the axon of each neuron of the second array of the second neural network portion forms an excitatory STDP synapse with the dendrite of a plurality of neurons of the third array.

According to an embodiment of the present disclosure, the third array comprises rows and columns of neurons, wherein the axon of each neuron of the second array of the first neural network portion forms an excitatory STDP synapse with the dendrite of a plurality of neurons of a row of the third array; and wherein the axon of each neuron of the second array of the second neural network portion forms an excitatory STDP synapse with the dendrite of a plurality of neurons of a column of the third array.

According to an embodiment of the present disclosure, the neural network comprises a third neural network portion as described above, as well as a fourth array having a second number of neurons and a third number of interneurons distributed among the neurons of the fourth array, wherein: the axon of each neuron of the fourth array forms an excitatory STDP synapse with the dendrite of the neighboring interneurons of the fourth array; and the axon of each interneuron of the fourth array forms an inhibitory STDP synapse with the dendrite of the neighboring neurons and interneurons of the fourth array; wherein the dendrite of each neuron of the fourth array forms an excitatory STDP synapse with the axon of a plurality of neurons of the third array; and wherein the dendrite of each neuron of the fourth array forms an excitatory non-STDP synapse with the axon of a corresponding neuron of the second array of the third neural network.

According to an embodiment of the present disclosure, the input signals to the first and second neural network portions relate to variable parameters that are to be correlated to the input signals to the third neural network.

According to an embodiment of the present disclosure, the first array of neurons comprises first and second sub-arrays of neurons provided for receiving input signals related to first and second measured parameters, respectively.

According to an embodiment of the present disclosure, the second array comprises rows and columns of neurons; wherein the axon of each neuron of the first sub-array of neurons forms an excitatory STDP synapse with the dendrite of a plurality of neurons of a row of the second array; and wherein the axon of each neuron of the second sub-array of neurons forms an excitatory STDP synapse with the dendrite of a plurality of neurons of a column of the second array.

According to an embodiment of the present disclosure, the second array further comprises a third number of interneurons distributed among the neurons of the second array, wherein the third number is smaller than the second number, wherein the axon of each neuron of the second array forms an excitatory STDP synapse with the dendrite of the neighboring interneurons of the second array; and the axon of each interneuron of the second array forms an inhibitory STDP synapse with the dendrite of the neighboring neurons and interneurons of the second array.

According to an embodiment of the present disclosure, the neural network further comprises: a third array having a fourth number of neurons and a fifth number of interneurons distributed among the neurons of the third array, wherein the fifth number is smaller than the fourth number, wherein: the axon of each neuron of the third array forms an excitatory STDP synapse with the dendrite of the neighboring interneurons of the third array; and the axon of each interneuron of the third array forms an inhibitory STDP synapse with the dendrite of the neighboring neurons and interneurons of the third array; wherein the dendrite of each neuron of the third array forms an excitatory STDP synapse with the axon of each neuron of the second array.

According to an embodiment of the present disclosure, the neural network comprises as many neurons as the third array of neurons, wherein the dendrite of each neuron of the fourth array is provided for receiving an input signal indicating that a measured parameter gets closer to a predetermined value assigned to said neuron; wherein the axon of each neuron of the fourth array forms an excitatory non-STDP synapse with the dendrite of a corresponding neuron of the third array.

According to an embodiment of the present disclosure, the input signals to the first and second sub-arrays of neurons relate to variable parameters that are to be correlated to the input signals to the fourth array.

According to an embodiment of the present disclosure, the fourth array of neurons is a sub-array of neurons of a further neural network as described above.

Another embodiment of the present disclosure comprises a method of programming a neural network, the method comprising: providing a first neural network portion comprising a first array having a first number of neurons and a second array having a second number of neurons, wherein the second number is smaller than the first number, the dendrite of each neuron of the second array forming an excitatory STDP synapse with the axon of a plurality of neurons of the first array; the dendrite of each neuron of the second array forming an excitatory STDP synapse with the axon of neighboring neurons of the second array; and providing to the dendrite of each neuron of the first array an input signal indicating that a measured parameter gets closer to a predetermined value assigned to said neuron.

According to an embodiment of the present disclosure, the method further comprises providing the second array with a third number of interneurons distributed among the neurons of the second array, wherein the third number is smaller than the second number, wherein: the axon of each neuron of the second array forms an excitatory STDP synapse with the dendrite of the neighboring interneurons of the second array; and the axon of each interneuron of the second array forms an inhibitory STDP synapse with the dendrite of the neighboring neurons and interneurons of the second array.

According to an embodiment of the present disclosure, the method comprises providing the dendrite of each neuron of the first array with an input signal having a rate that increases when a measured parameter gets closer to a predetermined value assigned to said neuron.

According to an embodiment of the present disclosure, the method comprises: providing a second neural network portion having the same structure as the first neural network portion; and providing a third array having a fourth number of neurons and a fifth number of interneurons distributed among the neurons of the third array, wherein the fifth number is smaller than the fourth number, wherein: the axon of each neuron of the third array forms an excitatory STDP synapse with the dendrite of the neighboring interneurons of the third array; and the axon of each interneuron of the third array forms an inhibitory STDP synapse with the dendrite of the neighboring neurons and interneurons of the third array; wherein the axon of each neuron of the second array of the first neural network portion forms an excitatory STDP synapse with the dendrite of a plurality of neurons of the third array; and wherein the axon of each neuron of the second array of the second neural network portion forms an excitatory SILT synapse with the dendrite of a plurality of neurons of the third array; and providing to the dendrite of each neuron of the first array of the second neural network portion an input signal indicating that a measured parameter gets closer to a predetermined value assigned to said neuron.

According to an embodiment of the present disclosure, the method comprises: providing a third neural network portion having the same structure as the first neural network portion; providing a fourth array having a second number of neurons and a third number of interneurons distributed among the neurons of the fourth array, wherein: the axon of each neuron of the fourth array forms an excitatory STDP synapse with the dendrite of the neighboring interneurons of the fourth array; and the axon of each interneuron of the fourth array forms an inhibitory STDP synapse with the dendrite of the neighboring neurons and interneurons of the fourth array; wherein the dendrite of each neuron of the fourth array forms an excitatory STDP synapse with the axon of a plurality of neurons of the third array; and wherein the dendrite of each neuron of the fourth array forms an excitatory non-STDP synapse with the axon of a corresponding neuron of the second array of the third neural network; and providing to the dendrite of each neuron of the first array of the third neural network portion an input signal indicating that a measured parameter gets closer to a predetermined value assigned to said neuron.

According to an embodiment of the present disclosure, the input signals to the first and second neural network portions relate to variable parameters that are to be correlated to the input signals to the third neural network portion.

According to an embodiment of the present disclosure, said providing to the dendrite of each neuron of the first array an input signal indicating that a measured parameter gets closer to a predetermined value assigned to said neuron comprises: providing to the dendrite of each neuron of a first subset of neurons of the first array an input signal indicating that a first measured parameter gets closer to a predetermined value assigned to said neuron; providing to the dendrite of each neuron of a second subset of neurons of the first array an input signal indicating that a second measured parameter gets closer to a predetermined value assigned to said neuron.

According to an embodiment of the present disclosure, said providing a second array having a second number of neurons comprises providing a second array having rows and columns of neurons, wherein the axon of each neuron of the first subset of neurons of the first array forms an excitatory STDP synapse with the dendrite of a plurality of neurons of a row of the second array; and wherein the axon of each neuron of the second subset of neurons of the first array forms an excitatory STDP synapse with the dendrite of a plurality of neurons of a column of the second array.

According to an embodiment of the present disclosure, the method further comprises providing the second array with a third number of interneurons distributed among the neurons of the second array, wherein the third number is smaller than the second number, wherein the axon of each neuron of the second array forms an excitatory STDP synapse with the dendrite of the neighboring interneurons of the second array; and the axon of each interneuron of the second array forms an inhibitory STDP synapse with the dendrite of the neighboring neurons and interneurons of the second array.

According to an embodiment of the present disclosure, the method comprises: providing a third array having a fourth number of neurons and a fifth number of interneurons distributed among the neurons of the third array, wherein the fifth number is smaller than the fourth number, wherein the axon of each neuron of the third array forms an excitatory STDP synapse with the dendrite of the neighboring interneurons of the third array; and the axon of each interneuron of the third array forms an inhibitory STDP synapse with the dendrite of the neighboring neurons and interneurons of the third array; wherein the dendrite of each neuron of the third array forms an excitatory STDP synapse with the axon of each neuron of the second array; and providing a fourth array comprising as many neurons as the third array of neurons, wherein the dendrite of each neuron of the fourth array is provided for receiving an input signal indicating that a measured parameter gets closer to a predetermined value assigned to said neuron; and wherein the axon of each neuron of the fourth array forms an excitatory non-STDP synapse with the dendrite of a corresponding neuron of the third array; the method further comprising providing to the dendrite of each neuron of the fourth array an input signal indicating that a measured parameter gets closer to a predetermined value assigned to said neuron; wherein the input signals to the first and second subset of neurons relate to variable parameters that are to be correlated to the input signals to the fourth array.

Another embodiment of the present disclosure comprises a method of decoding an output of a neural network having first and second neural network portions as detailed above; the method comprising: providing the first arrays of the first and second neural network portions with first and second input signals having a rate that increases when a measured parameter gets closer to a predetermined value assigned to the neurons of said first arrays; assigning to each neuron of the fourth array of neurons an incremental position value comprised between 1 and N, N being the number of neurons of the fourth array; at any given time, measuring the firing rate of each neuron of the fourth array; and estimating the output of the neural network, at said any given time, as corresponding to the neuron of the fourth array having a position value equal to a division of the sum of the position value of each neuron of the fourth array, weighted by its firing rate at said any given time, by the sum of the firing rates of each neuron of the fourth array at said any given time.

According to an embodiment of the present disclosure, the method comprises, if the neurons of the middle of the fourth array have null firing rates, assigning to the neurons of lower position value a position value increased by the value N.

Another embodiment of the present disclosure comprises a method of decoding an output of a neural network having first and second sub-arrays of neurons as disclosed above; the method comprising: providing the first and second sub-arrays of neurons with first and second input signals having a rate that increases when a measured parameter gets closer to a predetermined value assigned to the neurons of said first and second sub-arrays of neurons; assigning to each neuron of the third array of neurons an incremental position value comprised between 1 and N, N being the number of neurons of the third array; at any given time, measuring the firing rate of each neuron of the third array; and estimating the output of the neural network, at said any given time, as corresponding to the neuron of the third array having a position value equal to a division of the sum of the position value of each neuron of the third array, weighted by its firing rate at said any given time, by the sum of the firing rates of each neuron of the third array at said any given time.

According to an embodiment of the present disclosure, the method comprises, if the neurons of the middle of the third array have null firing rates, assigning to the neurons of lower position value a position value increased by the value N.

An embodiment of the present disclosure comprises a neural network that includes a plurality of input channels; an intermediate layer of neurons including a plurality of recurrent connections between a plurality of the neurons; a plurality of inhibitor interneurons connected to the intermediate layer of neurons; a plurality of first connections configured to connect the intermediate layer of neurons to a prediction layer; and a plurality of second connections configured to connect the prediction layer to an output layer.

According to an embodiment of the present disclosure, the output layer is configured to be connected to a further layer of neurons, and the further layer of neurons may be connected to one or more additional prediction layers by one or more connections. The one or more additional prediction layers may be configured to be connected to one or more additional circuits. The intermediate layer of neurons may be connected to the plurality of inhibitor interneurons by a plurality of electrical synapses. The input channels may provide a spike train to the first layer of neurons.

An embodiment of the present disclosure comprises a non-transitory computer-useable storage medium for signal delivery in a system including multiple circuits, said medium having a computer-readable program, wherein the program upon being processed on a computer causes the computer to implement the steps of: receiving at a first layer of neurons a spike train; transferring a plurality of inhibitor interneurons to the first layer of neurons; passing the first layer of neurons, by a plurality of first connections, to a prediction layer; and coupling the prediction layer to an output circuit by a plurality of second connections.

An embodiment of the present disclosure comprises a method of signal delivery in a system including a plurality of input channels including receiving at a first layer of neurons a spike train; transferring a plurality of inhibitor interneurons to the first layer of neurons; passing the first layer of neurons, by a plurality of first connections, to a prediction layer; and coupling the prediction layer to an output circuit by a plurality of second connections.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

FIG. 8 illustrates the application of a neural network model according to an embodiment of the present disclosure to a 2DL robotic arm.

FIGS. 13A-D illustrate the performances of the neural network model of FIG. 8 for varying degrees of damaged neurons.

DETAILED DESCRIPTION

Each of the additional features and teachings disclosed below can be utilized separately or in conjunction with other features and teachings to provide a computer-implemented device, system, and/or method for a neural network model to learn arbitrary multiple transformations for a self-realizing network. Representative examples of embodiments of the present disclosure, which examples utilize many of these additional features and teachings both separately and in combination, will now be described in further detail with reference to the attached drawings. The present detailed description is merely intended to teach a person of skill in the art further details for practicing preferred aspects of the present teachings and is not intended to limit the scope of the disclosure. Therefore, combinations of features and steps disclosed in the following detail description may not be necessary to practice embodiments of the present disclosure in the broadest sense, and are instead taught merely to particularly describe representative examples of the present teachings.

The following are expressly incorporated by reference in their entirety herein: "Self-Organizing Spiking Neural Model for Learning Fault-Tolerant Spatio-Motor Transformations," *IEEE Transactions on Neural Networks and Learning Systems*, Vol. 23, No. 10, October 2012; U.S. patent application Ser. No. 13/679,727, filed Nov. 16, 2012, and entitled "Spike Domain Neuron Circuit with Programmable Kinetic Dynamics, Homeostatic Plasticity and Axonal Delays;" U.S. patent application Ser. No. 13/415,812, filed on Mar. 8, 2012, and entitled "Spike Timing Dependent Plasticity Apparatus, System and Method;" and U.S. patent application Ser. No. 13/708,823, filed on Dec. 7, 2012, and entitled "Cortical Neuromorphic Network System and Method."

Devices, methods, and systems are hereby described for a neural network model; in particular a spiking model capable of learning arbitrary multiple transformations for a self-realizing network (SRN). The described systems and methods may be used to develop self-organizing robotic platforms (SORB) that autonomously discover and extract key patterns during or from real world interactions. In some configurations, the interactions may occur without human intervention. The described SRN may be configured for unmanned ground and air vehicles for intelligence, surveillance, and reconnaissance (ISR) applications.

Figure 4:
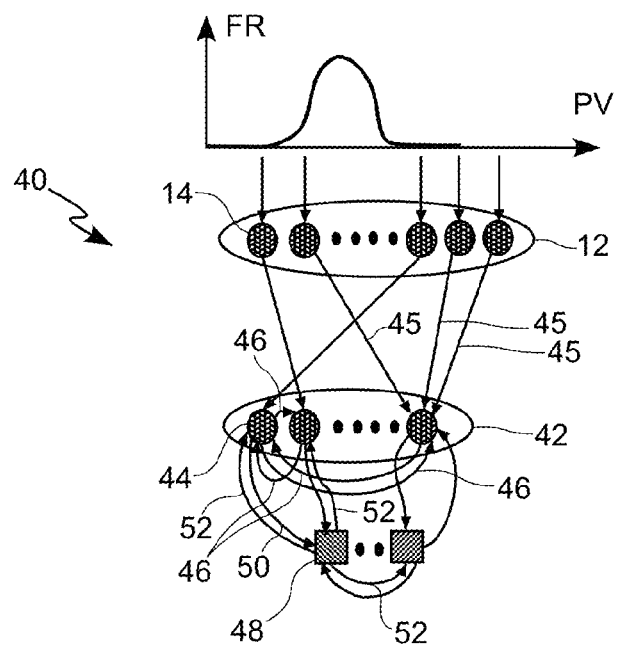
FIG. 4 illustrates a portion of a neural network model according to an embodiment of the present disclosure.

FIG. 4 illustrates a portion of a neural network or neural network model 40 according to an embodiment of the present disclosure. According to an embodiment of the present disclosure, an input array/layer 12 comprises a first number of neurons 14. The dendrite of each neuron 14 of the input array 12 is provided for receiving an input signal indicating that a measured parameter gets closer to a predetermined value assigned to said neuron. 11.

According to an embodiment of the present disclosure, the input signal sent to each neuron 14, relating to a measured parameter, has a rate that increases when the measured parameter gets closer to a predetermined value assigned to said neuron. FIG. 4 shows the firing rate FR of the input signals at a given time, with respect to the position value PV of the neurons 14. According to an embodiment of the present disclosure, the neurons are integrate and fire neurons, or operate under a model of integrate and fire neurons and the neural network or neural network model is a spiking neural network or spiking neural network model.

According to an embodiment of the present disclosure, the portion of neural network model 40 comprises an intermediate array/layer 42 having a second number of neurons 44. According to an embodiment of the present disclosure, the second number is smaller than the first number. According to an embodiment of the present disclosure, the dendrite of each neuron 44 of the intermediate array forms an excitatory STDP synapse with the axon of a plurality of neurons 14 of the input array 12. According to an embodiment of the present disclosure, the dendrite of each neuron 44 of the intermediate array 42 can form STDP synapses with the axon of 100 to 200 neurons 14 of the input array.

According to an embodiment of the present disclosure, the dendrite of each neuron 44 of the intermediate array 42 forms an excitatory STDP synapse 46 with the axon of neighboring neurons 44 of the intermediate array 42. According to an embodiment of the present disclosure, neighboring neurons can be a predetermined number of closest neurons in both direction of the array. According to an embodiment of the present disclosure, the intermediate array 42 further comprises a third number of interneurons 48 distributed among the neurons 44, wherein the third number is smaller than the second number. According to an embodiment of the present disclosure, the third number can be about one fourth of the second number. According to an embodiment of the present disclosure, the interneurons 48 of an array are equally distributed among the neurons 44, for example according to a periodic or pseudorandom scheme. According to an embodiment of the present disclosure, the axon of each neuron 44 of the intermediate array 42 forms an excitatory STDP synapse 50 with the dendrite of a neighboring interneuron 48 of the intermediate array 42; and the axon of each interneuron 48 of the intermediate array 42 forms an inhibitory STDP synapse 52 with the dendrite of neighboring neurons 44 and interneurons 48 of the intermediate array 42. The recurrence in the intermediate layer enables a neural network or neural network model according to an embodiment of the present disclosure to be fault-tolerant. This is because neurons in the intermediate layer that do not receive inputs from the input layer neurons may receive inputs from within the neurons in the intermediate layer. This allows the structure to be able to interpolate the network activity despite the absence of feedforward inputs.

Figure 5:
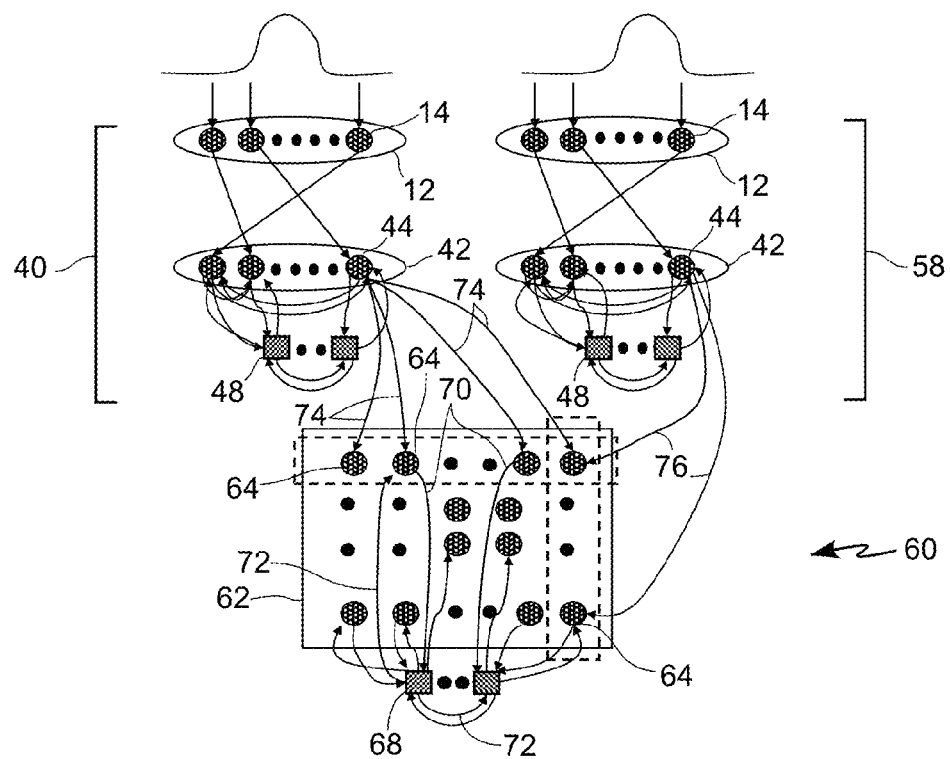
FIG. 5 illustrates a portion of a neural network model according to an embodiment of the present disclosure.

FIG. 5 illustrates a portion of a neural network or neural network model 60 according to an embodiment of the present disclosure. According to an embodiment of the present disclosure, the portion of neural network model 60 comprises two portions of neural model 40, 58 as described in relation with FIG. 4.

According to an embodiment of the present disclosure, the portion of neural network model 60 further comprises a network array 62 having a fourth number of neurons 64 and a fifth number of interneurons 68 distributed among the neurons of the network array, wherein the fifth number is smaller than the fourth number. According to an embodiment of the present disclosure, the axon of each neuron 64 of the network array forms an excitatory STDP synapse 70 with the dendrite of a neighboring interneuron 68 of the network array 62. According to an embodiment of the present disclosure, the axon of each interneuron 68 of the network array 62 forms an inhibitory STDP synapse 72 with the dendrite of neighboring neurons 64 and interneurons 68 of the network array 62. According to an embodiment of the present disclosure, the axon of each neuron 44 of the intermediate array 42 of the first neural network portion 40 forms an excitatory STDP synapse 74 with the dendrite of a plurality of neurons 64 of the network array 62. According to an embodiment of the present disclosure, the axon of each neuron 44 of the second array 42 of the second neural network portion 58 forms an excitatory STDP synapse 76 with the dendrite of a plurality of neurons 64 of the network array.

According to an embodiment of the present disclosure, the network array 62 comprises rows and columns of neurons 64 the axon of each neuron 44 of the second array 42 of the first neural network portion 40 forms an excitatory STDP synapse 74 with the dendrite of a plurality of neurons 64 of a row of the network array 62. The axon of each neuron 44 of the second array 42 of the second neural network portion 58 then forms an excitatory STDP synapse 76 with the dendrite of a plurality of neurons 64 of a column of the network array 62.

According to an embodiment of the present disclosure, the axon of each neuron 44 of the second array 42 of the first neural network portion 40 forms an excitatory STDP synapse 74 with the dendrite of a plurality of neurons 64 of a Gaussian neighborhood of neurons 64 of the network array 62; and the axon of each neuron 44 of the second array 42 of the second neural network portion 58 forms an excitatory STDP synapse 76 with the dendrite of a plurality of neurons 64 of a Gaussian neighborhood of neurons 64 of the network array 62.

According to an embodiment of the present disclosure, the axon of each neuron 44 of the second array 42 of the first neural network portion 40 forms an excitatory STDP synapse 74 with the dendrite of a plurality of random neurons 64 of the network array; and the axon of each neuron 44 of the second array 42 of the second neural network portion 58 forms an excitatory STDP synapse 76 with the dendrite of a plurality of random neurons 64 of the network array 42.

Figure 6:
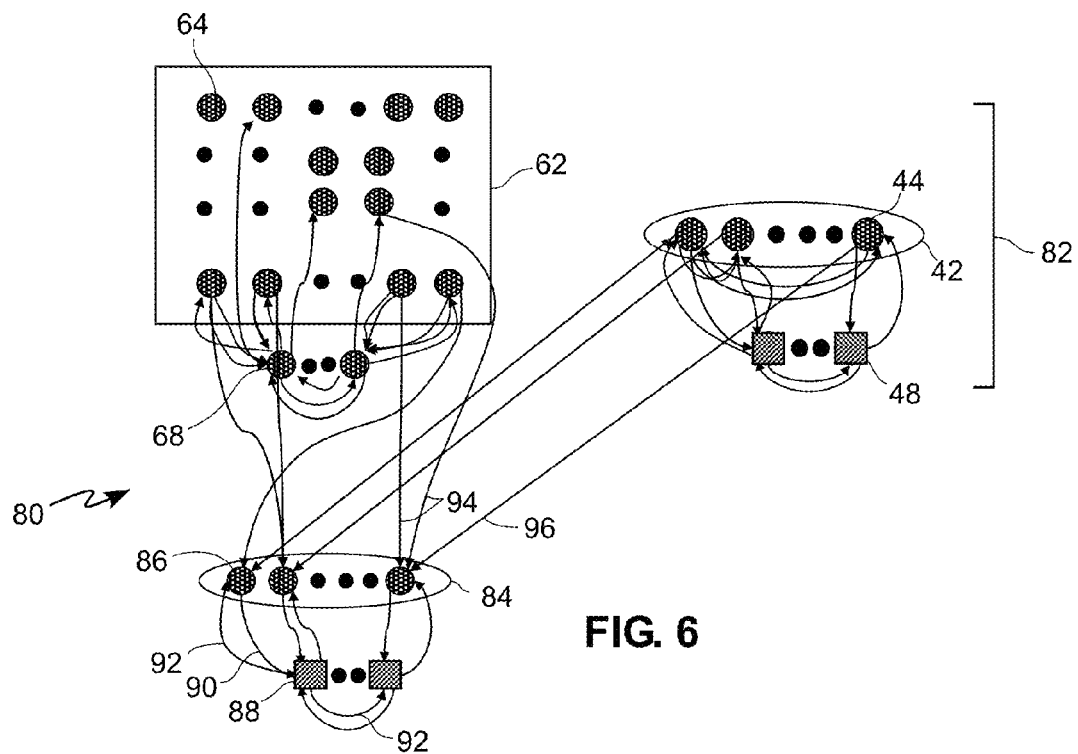
FIG. 6 illustrates a portion of a neural network model according to an embodiment of the present disclosure.

FIG. 6 illustrates a portion of a neural network or neural network model 80 according to an embodiment of the present disclosure, comprising the portion of neural network 60 described in relation with FIG. 5. For clarity, portions 40 and 58 are not illustrated. According to an embodiment of the present disclosure, neural network 80 comprises a third neural network portion 82 as described in relation with FIG. 4, comprising an input array (not shown) arranged for receiving input signals, and an intermediate array 42 having neurons 44 and interneurons 48. Neural network portion 82 is a training portion of neural network 80. According to an embodiment of the present disclosure, neural network 80 also comprises an output array 84 having a same number of neurons 86 as the intermediate array 42 of portion 82. According to an embodiment of the present disclosure, output array 84 comprises interneurons 88 distributed among the neurons 86. Interneurons 88 can be in the same number as in intermediate array 42. According to an embodiment of the present disclosure, the axon of each neuron 86 of the output array forms an excitatory STDP synapse 90 with the dendrite of a neighboring interneuron 88; and the axon of each interneuron 88 of the output array forms an inhibitory STDP synapse 92 with the dendrite of neighboring neurons 86 and interneurons 88 of the output array. According to an embodiment of the present disclosure, the dendrite of each neuron 86 of the output array forms an excitatory STDP synapse 94 with the axon of a plurality of neurons 64 of the network array 62; and the dendrite of each neuron 86 of the output array 84 forms an excitatory non-STDP synapse 96 with the axon of a corresponding neuron 44 of the intermediary array 42 of the neural network portion 82.

According to an embodiment of the present disclosure, the input signals to the neural network portions 40 and 58 relate to variable parameters that are to be correlated to input signals to training portion 82 during a training period.

According to an embodiment of the present disclosure, after a training period, input signals are no more sent to training portion 82, and the signals at the axon of neurons 86 of the output array provide the output of the neural network 80 to input signals provided to the neural network portions 40 and 58.

Figure 7:
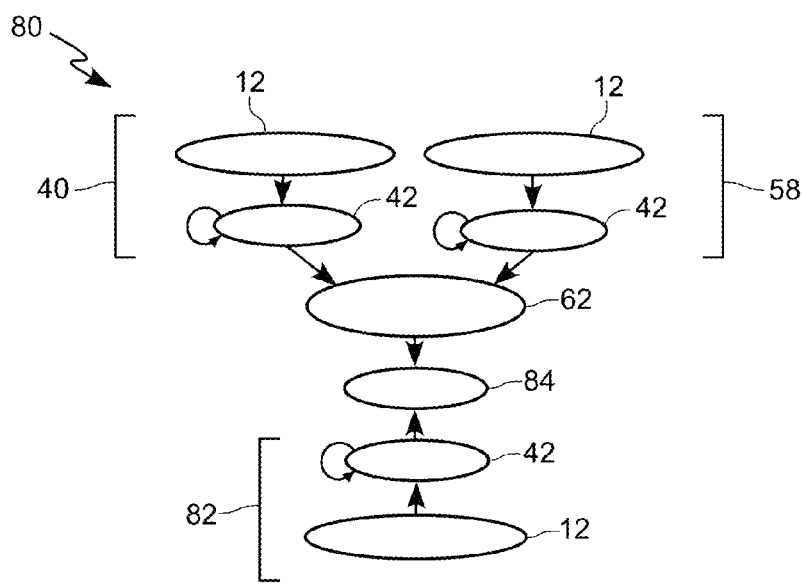
FIG. 7 is a schematic of a neural network model according to an embodiment of the present disclosure.

FIG. 7 schematizes a neural network 80 according to an embodiment of the present disclosure. The neural network 80 comprises a training portion 82, comprising an input array/layer 12 connected to an intermediate array/layer 42, connected as detailed above to an output array/layer 36. Neural network 80 further comprises two input portions 40 and 58 having each an input array/layer 12 connected to an intermediate layer 42; the intermediate layers being connected to a network layer 62. itself connected to output layer 84. According to an embodiment of the present disclosure, input portions 40 and 58 can be of identical or different sizes.

For example, an input portion having a large number of input neurons can be used to observe a parameter with increased precision, and reciprocally.

According to an embodiment of the present disclosure, neural network 80 can comprise more than one output layer 84 and more than one training portion such as training portion 82. Where neural network 80 comprises an additional output layer and one or more additional training portions, having sizes identical to, or different from, output layer 84 and training portion 82, the additional output layers and training portions can be connected to network layer 62 consistently with output layer 84 and training portion 82. The additional training portions will then receive in input additional parameters to be correlated with the parameters input to portions 40 and 58 during the training period, and the additional output layers will output said additional parameter in response to said parameters input to portions 40 and 58 after the training period.

According to an embodiment of the present disclosure, neural network 80 can comprise only one input portion 40 or more input portions than the two input portions 40 and 58. The neural network can then comprise more than one network layer 62, as well as intermediate network layers 62, if appropriate. Any number of input layers may be used depending on the application and the desired configuration. For example, the number of layers may reach 100 layers or more.

FIG. 8 illustrates the application of a neural network model 100 according to an embodiment of the present disclosure to a planar 2DL robotic arm 102. According to an embodiment of the present disclosure, the 2DL robotic arm 102 comprises a first arm 104 capable of making an angle θ1 with respect to a support 106 at a planar joint 108 arranged at a first end of arm 104. According to an embodiment of the present disclosure, the 2DL robotic arm 102 comprises a second arm 110 capable of making an angle θ2 in the same plane as θ1 with respect to the first arm 104 at a planar joint 112 arranged at a second end of arm 104.

According to an embodiment of the present disclosure, neural network model 100 comprises a first input layer $L_1^{\theta 1}$ coupled in a sparse feedforward configuration via STDP synapses to a first intermediate layer $L_2^{\theta 1}$, corresponding to arrays 12 and 42 of the first neural network portion 40 of FIG. 7. According to an embodiment of the present disclosure, neural network model 100 comprises a second input layer $L_1^{\theta 2}$ and a second intermediate layer $L_2^{\theta 2}$, corresponding to arrays 12 and 42 of the second neural network portion 58 of FIG. 7.

According to an embodiment of the present disclosure, neural network model 100 comprises a network layer $L_3$ corresponding to array 62 of FIG. 7 and connected to first and second intermediate layer $L_2^{\theta 1}$, $L_2^{\theta 2}$.

According to an embodiment of the present disclosure, neural network model 100 comprises a first training layer $L_1^x$ and a first intermediate layer $L_2^x$, corresponding to arrays 12 and 42 of the training neural network portion 82 of FIG. 7. According to an embodiment of the present disclosure, neural network model 100 comprises a second training layer $L_1^y$ and a second intermediate layer $L_2^y$, corresponding to arrays 12 and 42 of an additional (not shown in FIG. 7) training portion consistent with training portion 82 of FIG. 7.

According to an embodiment of the present disclosure, neural network model 100 comprises a first output layer $L_4^x$ corresponding to layer 84 of FIG. 7. According to an embodiment of the present disclosure, neural network model 100 comprises a second output layer $L_4^y$ corresponding to an additional (not shown in FIG. 7) output layer consistent with output layer 84 of FIG. 7.

Table (a) below illustrates the number of neurons that were used according to an embodiment of the present disclosure for the various layers/arrays of neural network model 100.

| (a) | | |
|---|---|---|
| Layer | Neuron type | Neurons |
| $L_1^{\theta 1}$ | E | 1000 |
| $L_1^{\theta 2}$ | E | 1000 |
| $L_1^x$ | E | 1000 |
| $L_1^y$ | E | 1000 |
| $L_2^{\theta 1}$ | E, I | 250 |
| $L_2^{\theta 2}$ | E, I | 250 |
| $L_2^x$ | E, I | 250 |
| $L_2^y$ | E, I | 250 |
| $L_3$ | E, I | 2000 |
| $L_4^x$ | E, I | 250 |
| $L_4^y$ | E, I | 250 |

Further, table (b) below illustrates the type and number of synapses existing between the neurons of the various layers of neural network model 100. According to embodiments of the present disclosure, an electrical synapse may refer to as a mathematical model of a synapse for use in applications including hardware, software, or a combination of both.

| (b) | | |
|---|---|---|
| Layer | Synapse type | Synapses |
| $L_1^{\theta 1} \rightarrow L_2^{\theta 1}$ | STDP | 40000 |
| $L_1^{\theta 2} \rightarrow L_2^{\theta 2}$ | STDP | 40000 |
| $L_1^x \rightarrow L_2^x$ | STDP | 40000 |
| $L_1^y \rightarrow L_2^y$ | STDP | 40000 |
| $L_2^{\theta 1} \rightarrow L_2^{\theta 1}$ | STDP | 1000 |
| $L_2^{\theta 2} \rightarrow L_2^{\theta 2}$ | STDP | 1000 |
| $L_2^x \rightarrow L_2^x$ | STDP | 1000 |
| $L_2^y \rightarrow L_2^y$ | STDP | 1000 |
| $L_2^{\theta 1} \rightarrow L_3$ | STDP | 230000 |
| $L_2^{\theta 2} \rightarrow L_3$ | STDP | 230 000 |
| $L_3 \rightarrow L_3$ | STDP | 2000 |
| $L_3 \rightarrow L_4^x$ | STDP | 320000 |
| $L_3 \rightarrow L_4^y$ | STDP | 320000 |
| $L_4^x \rightarrow L_4^x$ | STDP | 1000 |
| $L_4^y \rightarrow L_4^y$ | STDP | 1000 |
| $L_2^x \rightarrow L_4^x$ | Fixed, one-to-one | 200 |
| $L_2^y \rightarrow L_4^y$ | Fixed, one-to-one | 200 |

According to an embodiment of the present disclosure, input layer $L_1^{\theta 1}$ and input layer $L_1^{\theta 2}$ received input signals corresponding to the values of angles θ1 and θ2, having spiking rates for example comprised between 1 Hz and 100 Hz. For example, the spiking rate of a neuron m corresponding to layer $L_1^{\theta 1}$ was high when the angle of joint 108 was close to an angular position $\theta_{1m}$ associated to neuron m. According to an embodiment of the present disclosure, the spiking rates of the neighboring neurons (m−1 and m+1; etc. . . . ) responded in a Gaussian fashion with lower spiking rates farther away from neuron that spikes maximally. It is noted that according to an embodiment of the present disclosure, the neurons may respond to a small range of values for the variable of interest (e.g., $\theta_1$ for $L_1^{\theta 1}$). The signals corresponding to θ1 and θ2 were for example generated by proprioception, i.e from the internal state of the robotic arm.

According to an embodiment of the present disclosure, training layer $L_1^x$ and input layer $L_1^y$ received input signals corresponding to the position of the distal end of arm 110 in the plan of motion of the arm, in a coordinate system having x and y axes. The signals corresponding to x and y were for example generated using the processing of an image capture of the robotic arm, with:

$$x = l_1 \cos(\theta_1) + l_2 \cos(\theta_1 + \theta_2)$$

$$y = l_1 \sin(\theta_1) + l_2 \sin(\theta_1 + \theta_2)$$

Where $l_1$ and $l_2$ are the lengths of the two arm 104, 110 of the robot. In one embodiment, the joint angles ($\theta_1$, $\theta_2$) ranged from 0° to 360° while the x and y ranged from −1 to 1.

According to an embodiment of the present disclosure, the firing rate over time of the input and training signals can be represented by a cosine or similar curve. The firing rate r may be expressed as follows:

$$r = R_0 + R_1 \left( e^{\frac{-(s-a)^2}{2\sigma^2}} + e^{\frac{-(s+N-a)^2}{2\sigma^2}} + e^{\frac{-(s-N-a)^2}{2\sigma^2}} \right)$$

where $R_0$ is a minimum firing rate, $R_1$ is a maximum firing rate, σ represents a standard deviation of neuron location that is used in the Gaussian function to weight the firing rate depending upon the neuron location, and N is a total number of neurons in an input layer.

In one embodiment, the firing rate can be comprised between 1 Hz and 100 Hz; preferably between 10 Hz and 80 Hz and σ may be 5.

According to an embodiment of the present disclosure, to compensate for variable synaptic path lengths between the input layers from joint angle space to $L_4$ and between input layers from position space to $L_4$ (the position space having shorter path lengths than joint angle space pathways to layer $L_4$), a delay d in the feedback pathways (i.e., $L_2^x$ to $L_4^x$) may be used. In biological systems, this feedback may be similar to a delay in the proprioceptive feedback either from a visual system or through additional processing in the sensory cortex.

According to an embodiment of the present disclosure, a leaky integrate and fire neuron model can be used in which a neuron receives multiple excitatory input current signals ($i_1$, $i_2$, $i_3$ ...) and produces a single output spike signal. The output information can be encoded into the timing of these spikes ($t_1$, $t_2$ ...). The potential, V, of the leaky integrate and fire model can be determined using the membrane equation as:

$$\tau_m \frac{dV}{dt} = -(V_{rest} - V) + \sum w_{ex}(t)(E_{ex} - V) - \sum w_{in}(t)(E_{in} - V) \tag{1}$$

with $E_{ex} = 0$ mV and $E_{in} = 0$ mV. When the membrane potential reaches a threshold voltage $V_{thr}$, the neuron fires an action potential, and the membrane potential is reset to $V_{rest}$.

According to an embodiment of the present disclosure, an integrate and fire neural cell provides several different variables to control its membrane voltage including synaptic conductance w (both inhibitory and excitatory), membrane time constant $\tau_m$, the various constants for potentials (e.g., $E_{ex}$) and threshold for firing.

Synaptic inputs to the neuron may be configured as conductance changes with instantaneous rise times and exponential decays so that a single pre-synaptic spike at time t generates a synaptic conductance for excitatory and inhibitory synapses as follows:

$$w_{ex}(t) = w e^{\frac{-t}{\tau_{AMPA}}} \tag{2}$$

$$w_{in}(t) = w e^{\frac{-t}{\tau_{GABA}}} \tag{3}$$

where $\tau_{AMPA}$ and $\tau_{GABA}$ are the time constants for α-amino-3-hydroxy-5-methyl-4-isoxazolepropionic acid receptors (AMPA) for excitatory neurons and gamma-aminobutyric acidGABA receptors for inhibitory synapses.

In this configuration, the neuron model may be self-normalizing in which the multiplicative effect of synaptic input occurs on its own membrane voltage, referred to as voltage shunting. This neuron model may enables the self-regulation of its own excitation and is biologically consistent. The value of the excitatory synaptic conductance $w_{ex}(t)$ (in equation 1) is determined by STDP. We will now outline the STDP learning rule.

In one example, a synapse may be represented by a junction between two interconnected neurons. The synapse may include two terminals. One terminal may be associated with the axon of the neuron providing information (this neuron is referred as the pre-synaptic neuron). The other terminal may be associated with the dendrite of the neuron receiving the information (this is referred as the post-synaptic neuron).

For a synapse with a fixed synaptic conductance, w, only the input and the output terminals may be required. In one example, the conductance of the synapse may be internally adjusted according to a learning rule referred to as the spike-timing dependent plasticity or STDP.

The system may be configured with a STDP function that modulates the synaptic conductance w based on the timing difference ($ti_{pre} - tj_{post}$) between the action potentials of pre-synaptic neuron i and post-synaptic neuron j. There are two possibilities for the modulation of synaptic conductance. If the timing difference ($ti_{pre} - tj_{post}$) is positive, then synapse undergoes depression. If the timing difference ($ti_{pre} - tj_{post}$) is negative, then the synapse may undergo potentiation. If the timing difference is too large on either direction, there is no change in the synaptic conductance. In one embodiment, the timing difference may be 80 ms.

The STDP function may include four parameters (A+, A−, $\tau^+$ and $\tau^-$) that control the shape of the function. The A+ and A− correspond to the maximum change in synaptic conductance for potentiation and depression respectively. The time constants $\tau^+$ and $\tau^-$ control the rate of decay for potentiation and depression portions of the curve as shown in FIG. 5(a).

In one method, more than one pre- or post-synaptic spike within the time windows for potentiation or depression may occur. Accounting for these multiple spikes may be performed using an additive STDP model where the dynamics of potentiation P and depression D at a synapse are governed by:

$$\tau^- \frac{dD}{dt} = -D \tag{4}$$

-continued $$\tau^+ \frac{dP}{dt} = -P \quad (5)$$

Whenever a post-synaptic neuron fires a spike, D is decremented by an amount $A^-$ relative to the value governed by equation (6). Similarly, every time a synapse receives a spike from a pre-synaptic neuron, P is incremented by an amount $A^+$ relative to value governed by equation (7). These changes may be summarized as:

$$D = D + A^- \quad (6)$$

$$P = P + A^+ \quad (7)$$

These changes to P and D may affect the change in synaptic conductance. If the post-synaptic neuron fires a spike, then the value of P at that time, P*, is used to increment $\Delta w$ for the duration of that spike. Similarly, if the pre-synaptic neuron fires a spike that is seen by the synapse, then the value of D at that time, D*, is used to decrement $\Delta w$ for the duration of that spike. Thus, the net change $\Delta w$ is given by:

$$\Delta w = P^* - D^* \quad (8)$$

The final effective change to the synaptic conductance w due to STDP may be expressed as:

$$w = w + \Delta w \quad (9)$$

Figure 1:
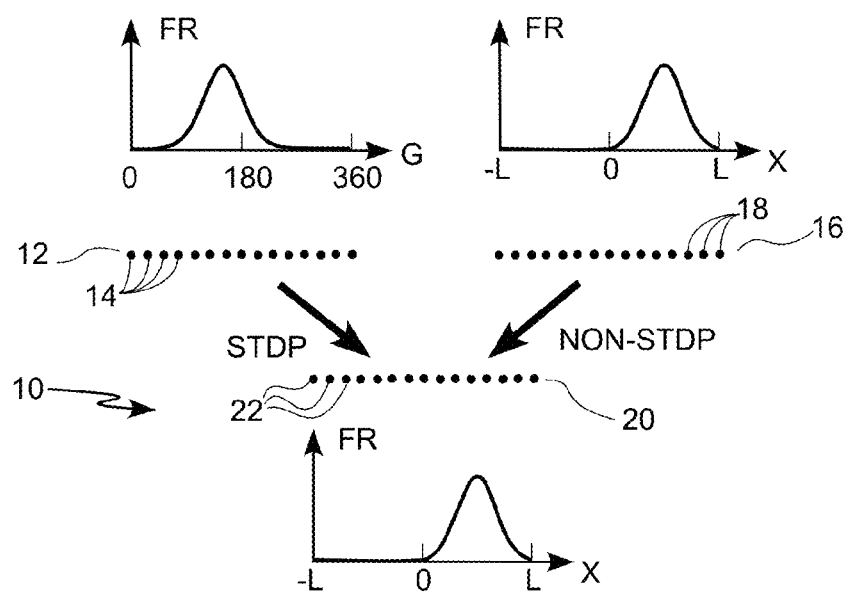
FIG. 1 illustrates a known neural network model.
Figure 2:
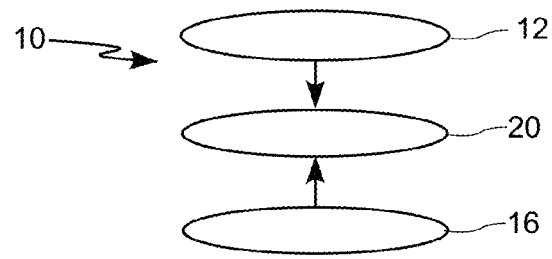
FIG. 2 is a schematic of model of FIG. 1.
Figure 3:
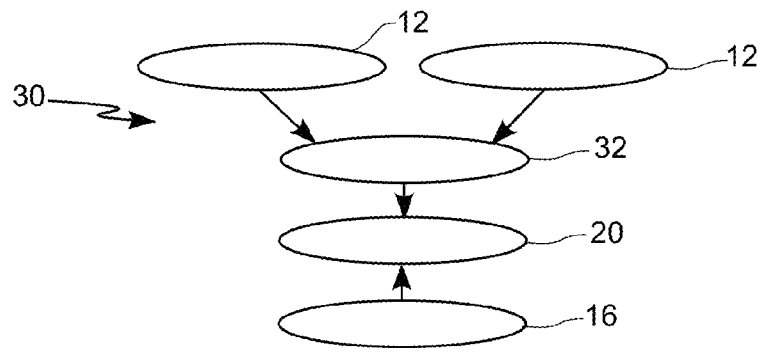
FIG. 3 is a schematic of another known neural network model.

In one embodiment as shown in FIG. 8, a spiking model may be configured to learn multiple transformations from a fixed set of input spike trains. As shown in FIG. 6, several prediction layer neurons 624 may be coupled or connected to their own training outputs 614. A prediction layer may refer to an output set of neurons 622 that predict the position of a robotic arm. In one embodiment, the model in FIG. 6 may function similar to the model described in FIG. 1.

In another embodiment, the system 600 described below may simultaneously learn multiple outputs or transformations of the input spike trains. In one example, the same inputs angles ($\theta 1$, $\theta 2$) may be used by the spiking model to generate multiple outputs using the equations 10 and 11 in the following.

The inventors have shown that a model as illustrated in FIG. 8 may be configured to learn several types of functions including anticipation, association and prediction and inverse transformations. In one embodiment, the system may be configured to use multiple possible pathways for input-to-output transformations. As discussed hereafter, the model is also fault tolerant.

Figure 9:
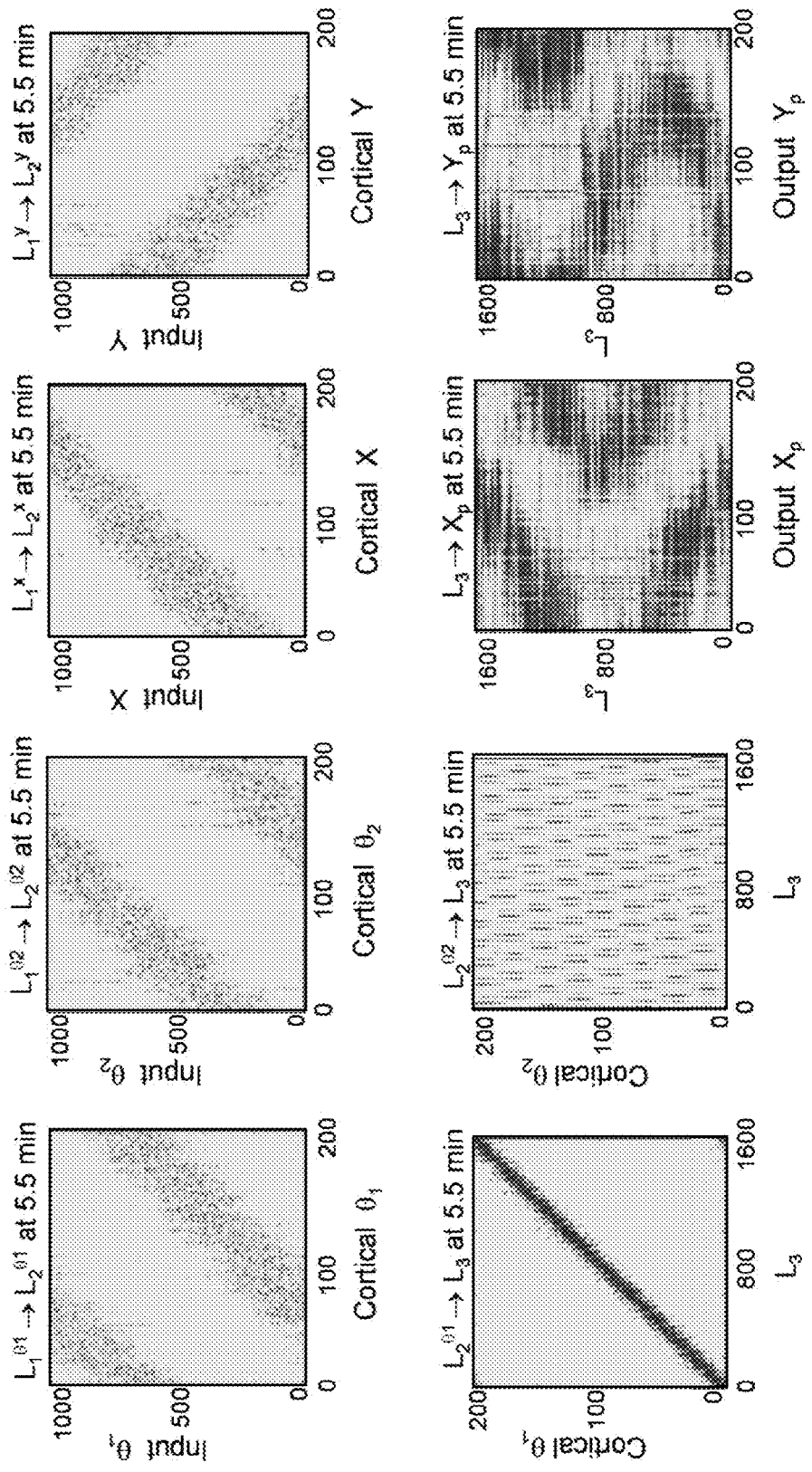
FIG. 9 illustrates the synaptic conductances between various layers during learning showing the emergence of topological organization of conductances in the neural network model of FIG. 8.

FIG. 9 illustrates the synaptic conductances between various layers of neural network model 100 during learning showing the emergence of topological organization of conductances in the neural network model of FIG. 8.

Figure 10A:
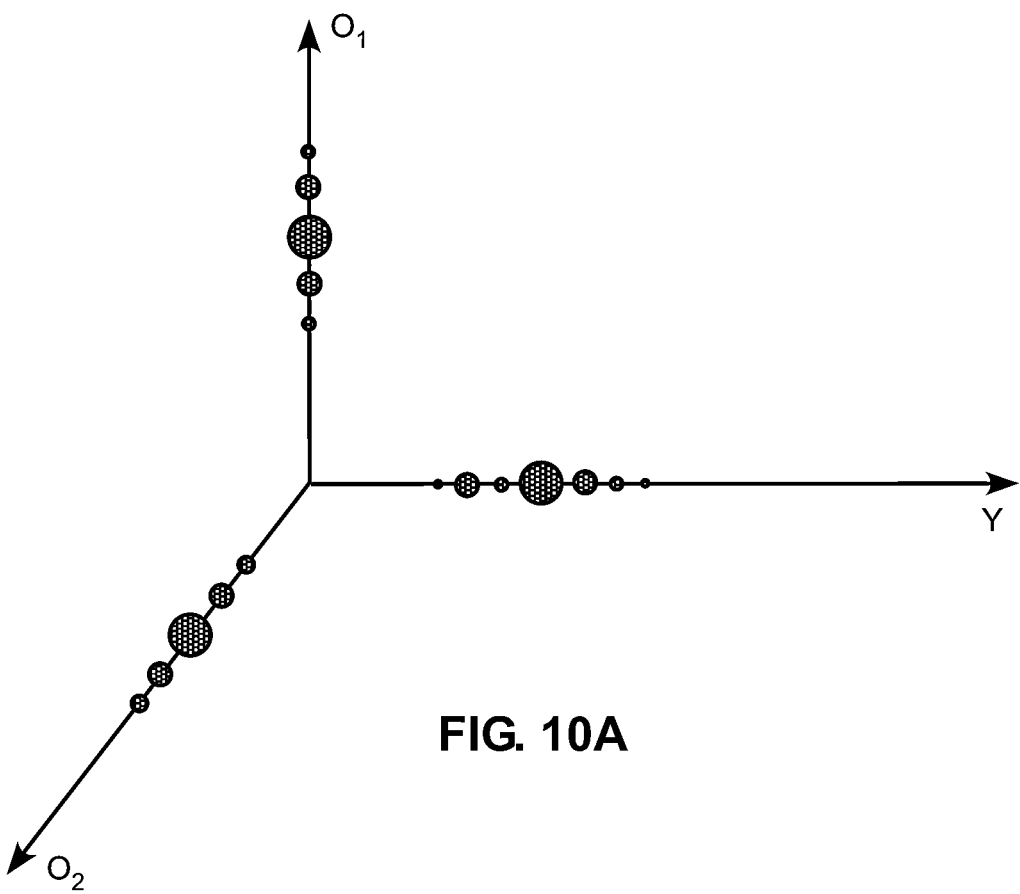
FIGS. 10A-B illustrate the output of layer $L_4^y$ in response to inputs on layers $L_1^{\theta 1}$ and $L_1^{\theta 2}$ of the neural network model of FIG. 8.

FIG. 10A illustrates the output of layer $L_4^y$ at a given time t in response to inputs on layers $L_1^{\theta 1}$ and $L_1^{\theta 2}$, after the training period of the neural network 100 has been completed. The diameter of the circles on the y, $\theta 1$ and $\theta 2$ axes increases with the firing rate of the neurons forming each axis. Only the neurons that fire are illustrated.

According to an embodiment of the disclosure, decoding the output of a neural network 80 as illustrated in FIG. 7 comprises:

a/ providing the first arrays 12 of the first and second neural network portions 40, 58 with first and second input signals having a rate that increases when a measured parameter gets closer to a predetermined value assigned to the neurons of said first arrays;

b/ assigning to each neuron of the output array of neurons 84 an incremental position value comprised between 1 and N, N being the number of neurons of the output array 84;

c/ at any given time, measuring the firing rate of each neuron of the output array 84; and d/ estimating the output of the neural network, at said any given time, as corresponding to the neuron of the output array 84 having a position value equal to a division of the sum of the position value of each neuron of the output array, weighted by its firing rate at said any given time, by the sum of the firing rates of each neuron of the output array at said any given time.

In other terms, $$y_P(i, j, t) = \frac{\sum_{k=1}^{N} f_{ijk}(t) \cdot y(i, j, k, t)}{\sum_{k=1}^{N} f_{ijk}(t)}$$

with $y_p(i, j, t)$ the evaluated output position at a given time t, for given values i, j of $\theta 1$ and $\theta 2$; $f_{ijk}(t)$ being the firing rate for a neuron k, at time t, for given values i, j of $\theta 1$ and $\theta 2$; and y(i, j, k, t) being the position value of a neuron k at time t, for given values i, j of $\theta 1$ and $\theta 2$.

Figure 10B:
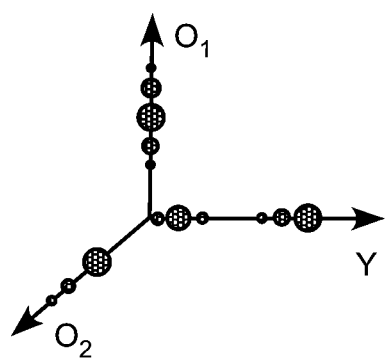

FIG. 10B illustrates the output of layer $L_4^y$ at a given time t in response to inputs on layers $L_1^{\theta 1}$ and $L_1^{\theta 2}$, after the training period of the neural network 100 has been completed, where the output on the y axis wraps around the end of the output array. According to an embodiment of the present disclosure, the method of measuring the output of array 84 comprises, if the neurons of the middle of the output array 84 have null firing rates, assigning to the neurons of lower position value a position value increased by the value N, N being the number of neurons of the output array 84. According to an embodiment of the present disclosure, the method described in relation with FIGS. 10A and 10B can also be used to decode the output of for example layer 84 of FIG. 14, described hereafter.

Figures 11A, 11B, 11C:
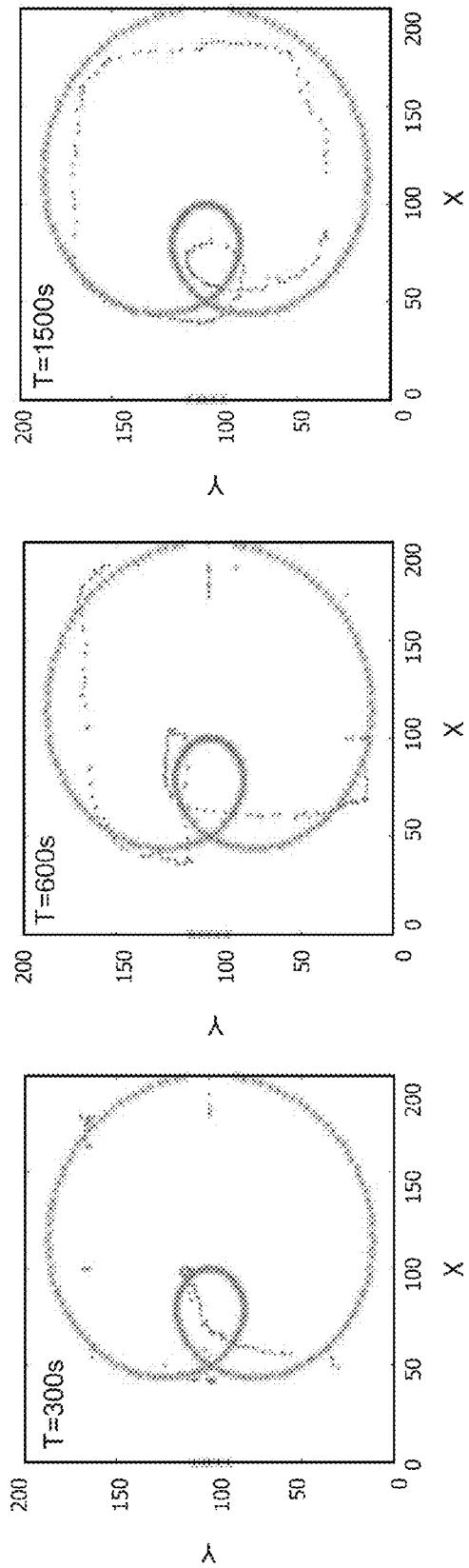
FIGS. 11A-C illustrate the incremental convergence of the neural network model of FIG. 8 as a function of learning.

FIGS. 11A-C illustrate the incremental convergence of the neural network model of FIG. 8 as a function of learning. In particular, FIG. 11A illustrates the x and y output of the neural network model of FIG. 8 after a training period of 300 seconds; FIG. 11B illustrates the x and y output of the neural network model of FIG. 8 after a training period of 600 seconds; and FIG. 11C illustrates the x and y output of the neural network model of FIG. 8 after a training period of 1500 seconds. The real values of x, y corresponding to the inputs used for FIGS. 11A-C follow the pretzel-shaped trajectory shown in darker.

Figure 12A:
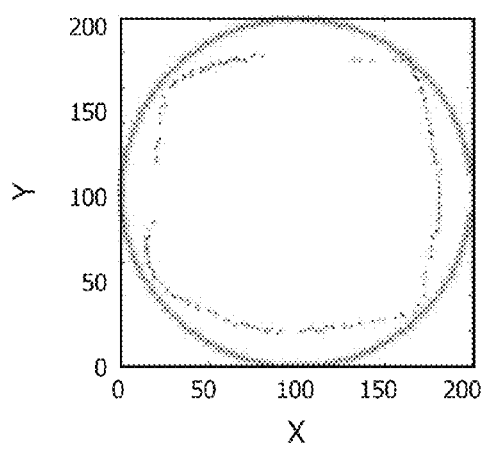
FIGS. 12A-D illustrate the incremental convergence of the neural network model of FIG. 8 for Gaussian sparse connectivity and random sparse connectivity.
Figure 12B:
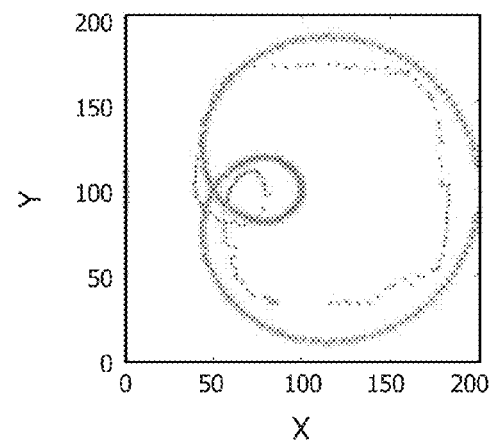

FIGS. 12A-B illustrate the incremental convergence of the neural network model of FIG. 8 when a Gaussian sparse connectivity is used between the neurons 44 of the intermediate arrays 42 and the network array 62.

Figure 12C:
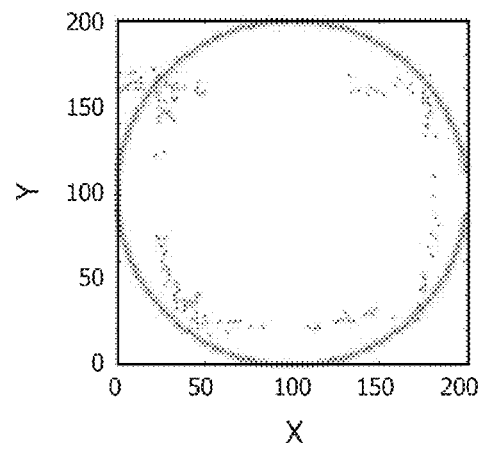
Figure 12D:
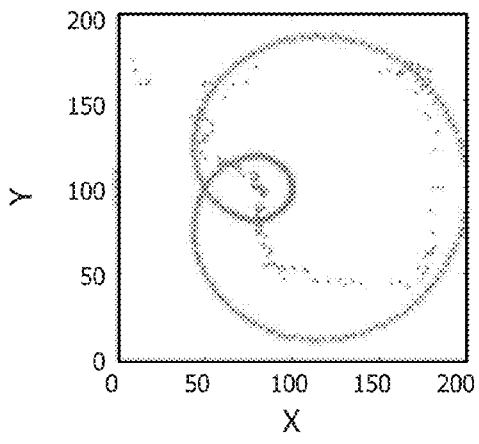

FIGS. 12C-D illustrate the incremental convergence of the neural network model of FIG. 8 when a random sparse connectivity is used between the neurons 44 of the intermediate arrays 42 and the network array 62.

FIGS. 13A-D illustrate the performances of the neural network model of FIG. 8 for varying degrees of damaged neurons. FIG. 13A(a) shows the neural activity, or cortical coding, of the synapses between $L_1^{\theta 1}$ and $L_2^{\theta 1}$ for a network having 5% of neurons damaged. FIG. 13A(b) shows the neural activity, or cortical coding, of the synapses within $L_2^{\theta 1}$ for a network having 5% of neurons damaged. FIG.

13A(c) shows the output x, y of a network having 5% of neurons damaged, compared to the real values of x, y (darker circle) corresponding to the inputs used for producing the output.

FIG. 13B(a)(b)(c) shows the same data as FIG. 13A(a)(b)(c) for network having 8% of neurons damaged.

FIG. 13C(a)(b)(c) shows the same data as FIG. 13A(a)(b)(c) for network having 12% of neurons damaged.

FIG. 13D(a)(b)(c) shows the same data as FIG. 13A(a)(b)(c) for network having 16% of neurons damaged.

As illustrated by FIGS. 13A-D, a neural network according to an embodiment of the present disclosure is robust to neuron damage, and produces satisfactory output even with significant neuron damage.

Figure 14:
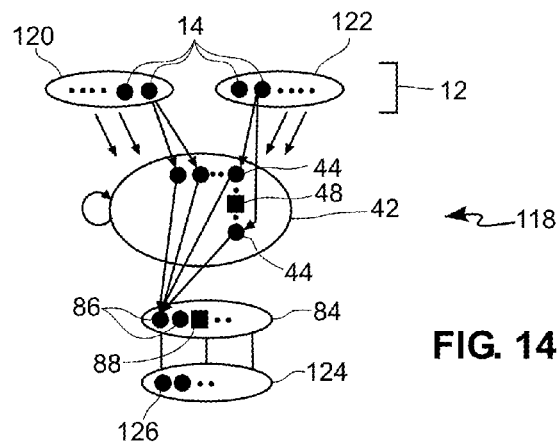
FIG. 14 is a schematic of a neural network model according to an embodiment of the present disclosure.

FIG. 14 illustrates a portion of a neural network or neural network model 118 according to an embodiment of the present disclosure, comprising an input array 12 of neurons 14 coupled to an intermediate array 42 of neurons 44 and interneurons 48. According to an embodiment of the present disclosure, the input array/layer 12 comprises first and second sub-arrays 120 and 122 of neurons 14. The neurons 14 of the first sub-array 120 are provided for receiving input signals related to a first measured parameter. The neurons 14 of the second sub-array 122 are provided for receiving input signals related to a second measured parameter. According to an embodiment of the present disclosure, the intermediate array 42 comprises rows and columns of neurons 44; the interneurons 48 being distributed among the neurons, wherein the axon of each neuron 14 of the first sub-array of neurons 120 forms an excitatory STDP synapse with the dendrite of a plurality of neurons 44 of a row of the intermediate array 42; and wherein the axon of each neuron 14 of the second sub-array of neurons 122 forms an excitatory STDP synapse with the dendrite of a plurality of neurons 44 of a column of the intermediate array 42.

According to an embodiment of the present disclosure, the neurons 44 of the intermediate array 42 can be arranged according to another scheme not comprising rows and columns; or the neurons of the first and second sub arrays 102, 122 can be connected to the neurons of intermediate array 42 according to a scheme, for example a sparse and random connection scheme, not following rows and columns in intermediate array 42. According to an embodiment of the present disclosure, one dendrite of a neuron 44 of the intermediate array 42 can form STDP synapses with the axon of 100 to 200 neurons 14 of the input array. According to an embodiment of the present disclosure, sub arrays 120, 122 can each comprise 1000 neurons and intermediate array can comprise 2000 neurons.

According to an embodiment of the present disclosure, input array 12 can comprise a number N of sub-arrays of neurons such as 120, 122, respectively provided for receiving input signals related to a number N of associated measured parameters. According to an embodiment of the present disclosure, each neuron 14 of each sub-array is provided for receiving an input signal indicating that the measured parameter associated to the sub-array gets closer to a predetermined value assigned to said neuron. For example, the rate of the signal sent to a neuron can increase when the measured parameter gets closer to a predetermined value assigned to said neuron, and reciprocally. The number of neurons of the sub-arrays can be identical or different.

According to an embodiment of the present disclosure, the neurons are integrate and fire neurons, or operate under a model of integrate and fire neurons and the neural network or neural network model is a spiking neural network or spiking neural network model.

According to an embodiment of the present disclosure, neural network 118 comprises an output array 84 having neurons 86 and interneurons 88 distributed among the neurons 86. According to an embodiment of the present disclosure, output array 84 can comprise one interneuron 88 for four neurons 86. According to an embodiment of the present disclosure, the axon of each neuron 86 of the output array forms an excitatory STDP synapse 90 with the dendrite of the neighboring interneurons 88; and the axon of each interneuron 88 of the output array forms an inhibitory STDP synapse 92 with the dendrite of the neighboring neurons 86 and interneurons 88 of the output array.

According to an embodiment of the present disclosure, the dendrite of each neuron 86 of the output array 84 forms an excitatory STDP synapse with the axon of each neuron 44 of the intermediate array 42.

According to an embodiment of the present disclosure, neural network 118 comprises a training array 124 comprising as many neurons 126 as the output array 84.

According to an embodiment of the present disclosure, the dendrite of each neuron 126 is provided for receiving an input signal indicating that a measured parameter gets closer to a predetermined value assigned to said neuron. According to an embodiment of the present disclosure, the axon of each neuron 126 of the training array 124 forms an excitatory non-STDP synapse with the dendrite of a corresponding neuron of the output array 84.

According to an embodiment of the present disclosure, the input signals to the first and second sub-arrays 120, 122 relate to variable parameters that are to be correlated by the neural network to the parameter that relate to the input signals to the training array 124. According to an embodiment of the present disclosure, the parameter signals are sent to first and second sub-arrays 120, 122 as well as to training array 124 during a training period. The signals sent to first and second sub-arrays 120, 122 can for example correspond to two angles measured for a two-level of freedom robot arm such as shown in FIG. 8, for random positions of the arm, whereas the signal sent to training array 124 can for example correspond to an x or y coordinate of the position of an end of said robot arm, as measured for each of said random positions.

After the training period, input signals are no more sent to training array 124 and the signals at the axon of neurons 86 of the output array provide the output of the neural network 118 to input signals provided to input arrays 120, 122.

Figure 15:
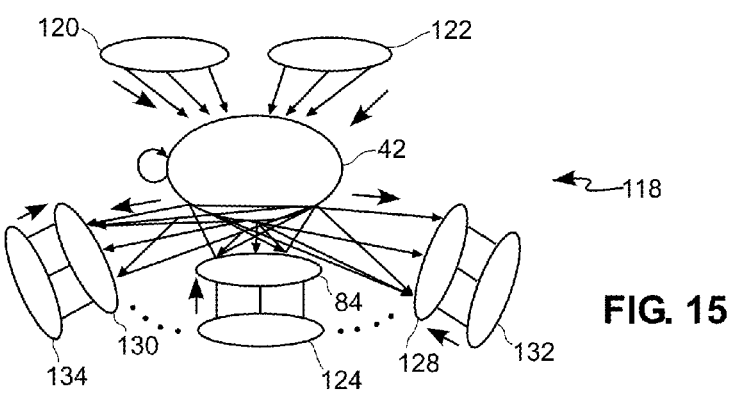
FIG. 15 is a schematic of a further embodiment of the neural network model of FIG. 14.

FIG. 15 illustrates the portion of a neural network or neural network model 118 of FIG. 14, comprising additional output layers 128, 130 connected to intermediate layer 42 in the same way as output layer 84. According to an embodiment of the present disclosure, output layers 84, 128 and 130 can comprise the same number of neurons, or different numbers of neurons. According to an embodiment of the present disclosure, additional output layers 128, 130 are connected to training layers 132, 134 in the same way output layer 84 is connected to training layer 124. According to an embodiment of the present disclosure, neural network 118 can comprise any number of additional output layer, each output layer being connected to a training layer as detailed above. The training periods for each output layer can have the same length and be simultaneous, or they can have different lengths and/or happen at different times.

Figure 16:
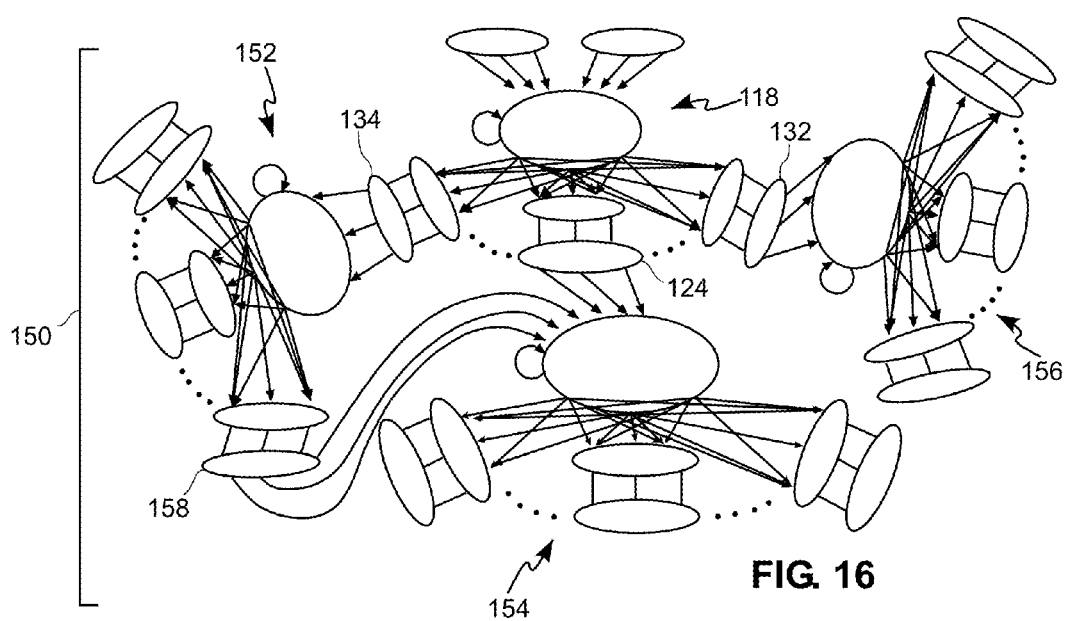
FIG. 16 is a schematic of a further embodiment of the neural network model of FIG. 14.

FIG. 16 illustrates a portion of a neural network or neural network model 150 comprising the neural network portion 118 of FIG. 15. According to an embodiment of the present disclosure, network 150 comprises additional neural network portions 152, 154, 156 similar to neural network portion 118, wherein the training arrays 134, 124, 132 of neural network portion 118 also from an input layer or input sub-array of neural network portions 152, 154, 156. According to an embodiment of the present disclosure, a training array 158 of neural network portion 152 forms an input sub-array of neural network portion 154. Neural network portions 118, 152, 154, 156 can be of the same size or of different sizes. Network 150 can comprise any number of neural network portions such as neural network portion 118.

In embodiments of the present disclosures, the neural network may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The present disclosure or any part(s) or function(s) thereof, may be implemented using hardware, software, or a combination thereof, and may be implemented in one or more computer systems or other processing systems. A computer system for performing the operations of the present disclosure and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the disclosure using other computer systems and/or architectures.

The foregoing description of the preferred embodiments of the present disclosure has been presented for purposes of illustration and description. It is not intended to be exhaustive or to limit the disclosure to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the disclosure and its best mode practical application, thereby to enable others skilled in the art to understand the disclosure for various embodiments and with various modifications as are suited to the particular use or implementation contemplated. It is intended that the scope of the disclosure be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way. It is also to be understood that the steps and processes recited in the claims need not be performed in the order presented.

The various features of the present disclosure can be implemented in different systems without departing from the present disclosure. It should be noted that the foregoing embodiments are merely examples and are not to be construed as limiting the present disclosure. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A neural network circuitry, wherein a portion of the neural network circuitry comprises:
a first array circuitry having a first number of neurons, wherein the dendrite of each neuron of the first array circuitry is provided for receiving an input signal indicating that a measured parameter gets closer to a predetermined value assigned to said neuron; a second array circuitry having a second number of neurons, the dendrite of each neuron of the second array circuitry forming an excitatory Spike-Timing-Dependent-Plasticity (STDP) synapse with the axon of a plurality of neurons of the first array circuitry; and the dendrite of each neuron of the second array circuitry forming an excitatory Spike-Timing-Dependent-Plasticity (STDP) synapse with the axon of neighboring neurons of the second array circuitry.

2. The neural network circuitry of claim 1, wherein the second number is smaller than the first number.

3. The neural network circuitry of claim 1, wherein the second array circuitry further comprises a third number of interneurons distributed among the neurons of the second array circuitry, wherein the third number is smaller than the second number, wherein: the axon of each neuron of the second array circuitry forms an excitatory Spike-Timing-Dependent-Plasticity (STDP) synapse with the dendrite of the neighboring interneurons of the second array circuitry; and the axon of each interneuron of the second array circuitry forms an inhibitory Spike-Timing-Dependent-Plasticity (STDP) synapse with the dendrite of the neighboring neurons and interneurons of the second array circuitry.

4. The neural network circuitry of claim 1, wherein the dendrite of each neuron of the first array circuitry is provided for receiving an input signal having a rate that increases when a measured parameter gets closer to a predetermined value assigned to said neuron.

5. A neural network circuitry comprising a first and a second neural network circuitry portions according to claim 1; and a third array circuitry having a fourth number of neurons and a fifth number of interneurons distributed among the neurons of the third array circuitry, wherein the fifth number is smaller than the fourth number, wherein: the axon of each neuron of the third array circuitry forms an excitatory Spike-Timing-Dependent-Plasticity (STDP) synapse with the dendrite of the neighboring interneurons of the third array circuitry; and the axon of each interneuron of the third array circuitry forms an inhibitory Spike-Timing-Dependent-Plasticity (STDP) synapse with the dendrite of the neighboring neurons and interneurons of the third array circuitry; wherein the axon of each neuron of the second array circuitry of the first neural network circuitry portion forms an excitatory Spike-Timing-Dependent-Plasticity (STDP) synapse with the dendrite of a plurality of neurons of the third array circuitry; and wherein the axon of each neuron of the second array circuitry of the second neural network circuitry portion forms an excitatory Spike-Timing-Dependent-Plasticity (STDP) synapse with the dendrite of a plurality of neurons of the third array circuitry.

6. The neural network circuitry of claim 5, wherein the third array circuitry comprises rows and columns of neurons, wherein the axon of each neuron of the second array circuitry of the first neural network circuitry portion forms an excitatory Spike-Timing-Dependent-Plasticity (STDP) synapse with the dendrite of a plurality of neurons of a row of the third array circuitry; and wherein the axon of each neuron of the second array circuitry of the second neural network circuitry portion forms an excitatory Spike-Timing-Dependent-Plasticity (STDP) synapse with the dendrite of a plurality of neurons of a column of the third array circuitry.

7. The neural network circuitry of claim 5, comprising a third neural network circuitry portion according to claim 1, as well as a fourth array circuitry having a second number of neurons and a third number of interneurons distributed among the neurons of the fourth array circuitry, wherein: the axon of each neuron of the fourth array circuitry forms an excitatory Spike-Timing-Dependent-Plasticity (STDP) synapse with the dendrite of the neighboring interneurons of the fourth array circuitry; and the axon of each interneuron of the fourth array circuitry forms an inhibitory Spike-Timing-Dependent-Plasticity (STDP) synapse with the dendrite of the neighboring neurons and interneurons of the fourth array circuitry; wherein the dendrite of each neuron of the fourth array circuitry forms an excitatory Spike-Timing-Dependent-Plasticity (STDP) synapse with the axon of a plurality of neurons of the third array circuitry; and wherein the dendrite of each neuron of the fourth array circuitry forms an excitatory non-Spike-Timing-Dependent-Plasticity (STDP) synapse with the axon of a corresponding neuron of the second array circuitry of the third neural network circuitry portion.

8. The neural network circuitry of claim 7, wherein the input signals to the first and second neural network circuitry portions relate to variable parameters that are to be correlated to the input signals to the third neural network circuitry portion.

9. A method of decoding an output of a neural network according to claim 8; the method comprising: providing the first arrays of the first and second neural network portions with first and second input signals having a rate that increases when a measured parameter gets closer to a predetermined value assigned to the neurons of said first arrays; assigning to each neuron of the fourth array of neurons an incremental position value comprised between 1 and N, N being the number of neurons of the fourth array; at any given time, measuring the firing rate of each neuron of the fourth array; and estimating the output of the neural network, at said any given time, as corresponding to the neuron of the fourth array having a position value equal to a division of the sum of the position value of each neuron of the fourth array, weighted by its firing rate at said any given time, by the sum of the firing rates of each neuron of the fourth array at said any given time.

10. The method of claim 9 comprising, if the neurons of the middle of the fourth array have null firing rates, assigning to the neurons of lower position value a position value increased by the value N.

11. The neural network circuitry of claim 1, wherein said first array circuitry of neurons comprises first and second sub-arrays of neurons provided for receiving input signals related to first and second measured parameters, respectively.

12. The neural network circuitry of claim 11, wherein the second array circuitry comprises rows and columns of neurons; wherein the axon of each neuron of the first sub-array of neurons forms an excitatory Spike-Timing-Dependent-Plasticity (STDP) synapse with the dendrite of a plurality of neurons of a row of the second array circuitry; and wherein the axon of each neuron of the second sub-array of neurons forms an excitatory Spike-Timing-Dependent-Plasticity (STDP) synapse with the dendrite of a plurality of neurons of a column of the second array circuitry.

13. The neural network circuitry of claim 12, wherein the second array circuitry further comprises a third number of interneurons distributed among the neurons of the second array circuitry, wherein the third number is smaller than the second number, wherein: the axon of each neuron of the second array circuitry forms an excitatory Spike-Timing-Dependent-Plasticity (STDP) synapse with the dendrite of the neighboring interneurons of the second array circuitry; and the axon of each interneuron of the second array circuitry forms an inhibitory Spike-Timing-Dependent-Plasticity (STDP) synapse with the dendrite of the neighboring neurons and interneurons of the second array circuitry.

14. The neural network circuitry of claim 13; further comprising: a third array circuitry having a fourth number of neurons and a fifth number of interneurons distributed among the neurons of the third array circuitry, wherein the fifth number is smaller than the fourth number, wherein: the axon of each neuron of the third array circuitry forms an excitatory Spike-Timing-Dependent-Plasticity (STDP) synapse with the dendrite of the neighboring interneurons of the third array circuitry; and the axon of each interneuron of the third array circuitry forms an inhibitory Spike-Timing-Dependent-Plasticity (STDP) synapse with the dendrite of the neighboring neurons and interneurons of the third array circuitry; wherein the dendrite of each neuron of the third array circuitry forms an excitatory Spike-Timing-Dependent-Plasticity (STDP) synapse with the axon of each neuron of the second array circuitry.

15. The neural network circuitry of claim 14, comprising a fourth array circuitry comprising as many neurons as the third array circuitry, wherein the dendrite of each neuron of the fourth array circuitry is provided for receiving an input signal indicating that a measured parameter gets closer to a predetermined value assigned to said neuron; wherein the axon of each neuron of the fourth array circuitry forms an excitatory non-Spike-Timing-Dependent-Plasticity (STDP) synapse with the dendrite of a corresponding neuron of the third array circuitry.

16. The neural network circuitry of claim 15, wherein the input signals to the first and second sub-arrays of neurons relate to variable parameters that are to be correlated to the input signals to the fourth array circuitry.

17. A method of decoding an output of a neural network according to claim 16; the method comprising: providing the first and second sub-arrays of neurons with first and second input signals having a rate that increases when a measured parameter gets closer to a predetermined value assigned to the neurons of said first and second sub-arrays of neurons; assigning to each neuron of the third array of neurons an incremental position value comprised between 1 and N, N being the number of neurons of the third array; at any given time, measuring the firing rate of each neuron of the third array; and estimating the output of the neural network, at said any given time, as corresponding to the neuron of the third array having a position value equal to a division of the sum of the position value of each neuron of the third array, weighted by its firing rate at said any given time, by the sum of the firing rates of each neuron of the third array at said any given time.

18. The method of claim 17 comprising, if the neurons of the middle of the third array have null firing rates, assigning to the neurons of lower position value a position value increased by the value N.

19. A method of programming a neural network, comprising: providing a first neural network portion comprising a first array having a first number of neurons and a second array having a second number of neurons, the dendrite of each neuron of the second array forming an excitatory Spike-Timing-Dependent-Plasticity (STDP) synapse with the axon of a plurality of neurons of the first array; the dendrite of each neuron of the second array forming an excitatory Spike-Timing-Dependent-Plasticity (STDP) synapse with the axon of neighboring neurons of the second array; and providing to the dendrite of each neuron of the first array an input signal indicating that a measured parameter gets closer to a predetermined value assigned to said neuron.

20. The method of claim 19, further comprising providing the second array with a third number of interneurons distributed among the neurons of the second array, wherein the third number is smaller than the second number, wherein: the axon of each neuron of the second array forms an excitatory Spike-Timing-Dependent-Plasticity (STDP) synapse with the dendrite of the neighboring interneurons of the second array; and the axon of each interneuron of the second array forms an inhibitory Spike-Timing-Dependent-Plasticity (STDP) synapse with the dendrite of the neighboring neurons and interneurons of the second array.

21. The method of claim 20, comprising providing the dendrite of each neuron of the first array with an input signal having a rate that increases when a measured parameter gets closer to a predetermined value assigned to said neuron.

22. The method of claim 20, comprising: providing a second neural network portion having the same structure as the first neural network portion; and providing a third array having a fourth number of neurons and a fifth number of interneurons distributed among the neurons of the third array, wherein the fifth number is smaller than the fourth number, wherein: the axon of each neuron of the third array forms an excitatory Spike-Timing-Dependent-Plasticity (STDP) synapse with the dendrite of the neighboring interneurons of the third array; and the axon of each interneuron of the third array forms an inhibitory Spike-Timing-Dependent-Plasticity (STDP) synapse with the dendrite of the neighboring neurons and interneurons of the third array; wherein the axon of each neuron of the second array of the first neural network portion forms an excitatory Spike-Timing-Dependent-Plasticity (STDP) synapse with the dendrite of a plurality of neurons of the third array; and wherein the axon of each neuron of the second array of the second neural network portion forms an excitatory Spike-Timing-Dependent-Plasticity (STDP) synapse with the dendrite of a plurality of neurons of the third array; and providing to the dendrite of each neuron of the first array of the second neural network portion an input signal indicating that a measured parameter gets closer to a predetermined value assigned to said neuron.

23. The method of claim 22, comprising: providing a third neural network portion having the same structure as the first neural network portion; providing a fourth array having a second number of neurons and a third number of interneurons distributed among the neurons of the fourth array, wherein: the axon of each neuron of the fourth array forms an excitatory Spike-Timing-Dependent-Plasticity (STDP) synapse with the dendrite of the neighboring interneurons of the fourth array; and the axon of each interneuron of the fourth array forms an inhibitory Spike-Timing-Dependent-Plasticity (STDP) synapse with the dendrite of the neighboring neurons and interneurons of the fourth array; wherein the dendrite of each neuron of the fourth array forms an excitatory Spike-Timing-Dependent-Plasticity (STDP) synapse with the axon of a plurality of neurons of the third array; and wherein the dendrite of each neuron of the fourth array forms an excitatory non-Spike-Timing-Dependent-Plasticity (STDP) synapse with the axon of a corresponding neuron of the second array of the third neural network; and providing to the dendrite of each neuron of the first array of the third neural network portion an input signal indicating that a measured parameter gets closer to a predetermined value assigned to said neuron; wherein the input signals to the first and second neural network portions relate to variable parameters that are to be correlated to the input signals to the third neural network portion.

24. The method of claim 19, wherein: said providing to the dendrite of each neuron of the first array an input signal indicating that a measured parameter gets closer to a predetermined value assigned to said neuron comprises: providing to the dendrite of each neuron of a first subset of neurons of the first array an input signal indicating that a first measured parameter gets closer to a predetermined value assigned to said neuron; providing to the dendrite of each neuron of a second subset of neurons of the first array an input signal indicating that a second measured parameter gets closer to a predetermined value assigned to said neuron.

25. The method of claim 24, wherein: said providing a second array having a second number of neurons comprises providing a second array having rows and columns of neurons, wherein the axon of each neuron of the first subset of neurons of the first array forms an excitatory Spike-Timing-Dependent-Plasticity (STDP) synapse with the dendrite of a plurality of neurons of a row of the second array; and wherein the axon of each neuron of the second subset of neurons of the first array forms an excitatory Spike-Timing-Dependent-Plasticity (STDP) synapse with the dendrite of a plurality of neurons of a column of the second array.

26. The method of claim 24, further comprising providing the second array with a third number of interneurons distributed among the neurons of the second array, wherein the third number is smaller than the second number, wherein: the axon of each neuron of the second array forms an excitatory Spike-Timing-Dependent-Plasticity (STDP) synapse with the dendrite of the neighboring interneurons of the second array; and the axon of each interneuron of the second array forms an inhibitory Spike-Timing-Dependent-Plasticity (STDP) synapse with the dendrite of the neighboring neurons and interneurons of the second array.

27. The method of claim 26, comprising: providing a third array having a fourth number of neurons and a fifth number of interneurons distributed among the neurons of the third array, wherein the fifth number is smaller than the fourth number, wherein the axon of each neuron of the third array forms an excitatory Spike-Timing-Dependent-Plasticity (STDP) synapse with the dendrite of the neighboring interneurons of the third array; and the axon of each interneuron of the third array forms an inhibitory Spike-Timing-Dependent-Plasticity (STDP) synapse with the dendrite of the neighboring neurons and interneurons of the third array; wherein the dendrite of each neuron of the third array forms an excitatory Spike-Timing-Dependent-Plasticity (STDP) synapse with the axon of each neuron of the second array; and providing a fourth array comprising as many neurons as the third array of neurons, wherein the dendrite of each neuron of the fourth array is provided for receiving an input signal indicating that a measured parameter gets closer to a predetermined value assigned to said neuron; and wherein the axon of each neuron of the fourth array forms an excitatory non-Spike-Timing-Dependent-Plasticity (STDP) synapse with the dendrite of a corresponding neuron of the third array; and providing to the dendrite of each neuron of the fourth array an input signal indicating that a measured parameter gets closer to a predetermined value assigned to said neuron; wherein the input signals to the first and second subset of neurons relate to variable parameters that are to be correlated to the input signals to the fourth array.

* * * * *